US011732653B2

United States Patent
Jarvo et al.

(10) Patent No.: US 11,732,653 B2
(45) Date of Patent: *Aug. 22, 2023

(54) SYSTEM AND METHOD FOR PURGING A FUEL MANIFOLD OF A GAS TURBINE ENGINE THROUGH A FLOW DIVIDER VALVE

(71) Applicant: PRATT & WHITNEY CANADA CORP., Longueuil (CA)

(72) Inventors: James Robert Jarvo, Saint-Bruno-de-Montarville (CA); Cédric Saintignan, Montreal (CA); Joseph Daniel Maxim Cirtwill, Gravenhurst (CA); Kian McCaldon, Orangeville (CA); Marc-Andre Tremblay, Montreal (CA); David Waddleton, Candiac (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 0 days.

This patent is subject to a terminal disclaimer.

(21) Appl. No.: 17/989,247

(22) Filed: Nov. 17, 2022

(65) Prior Publication Data

US 2023/0083847 A1 Mar. 16, 2023

Related U.S. Application Data

(62) Division of application No. 16/871,130, filed on May 11, 2020.

(Continued)

(51) Int. Cl.
*F02C 7/30* (2006.01)
*F02C 7/228* (2006.01)
(Continued)

(52) U.S. Cl.
CPC .............. *F02C 7/30* (2013.01); *F02C 6/00* (2013.01); *F02C 6/16* (2013.01); *F02C 7/222* (2013.01);
(Continued)

(58) Field of Classification Search
CPC ............. F02C 7/228; F02C 7/232; F02C 7/30
See application file for complete search history.

(56) References Cited

U.S. PATENT DOCUMENTS 2,712,218 A 7/1955 Ritter
3,344,602 A 10/1967 Omri et al.
(Continued)

FOREIGN PATENT DOCUMENTS

GB 2557599 A 6/2018

OTHER PUBLICATIONS

European Patent Office, Communication re. extended European search report for European Patent Application No. 20174977.7, dated Oct. 13, 2020.

*Primary Examiner* — Scott J Walthour
(74) *Attorney, Agent, or Firm* — Norton Rose Fulbright Canada LLP

(57) ABSTRACT

Methods and systems of operating a gas turbine engine in a low-power condition are provided. In one embodiment, the method includes supplying fuel to a combustor by supplying fuel to a first fuel manifold and a second fuel manifold of the gas turbine engine. The method also includes, while supplying fuel to the combustor by supplying fuel to the first fuel manifold: stopping supplying fuel to the second fuel manifold; and supplying pressurized air to the second fuel manifold to flush fuel in the second fuel manifold into the combustor and hinder coking in the second fuel manifold and associated fuel nozzles.

8 Claims, 26 Drawing Sheets

Related U.S. Application Data

(60) Provisional application No. 62/848,223, filed on May 15, 2019, provisional application No. 62/848,187, filed on May 15, 2019, provisional application No. 62/848,196, filed on May 15, 2019, provisional application No. 62/848,231, filed on May 15, 2019, provisional application No. 62/849,428, filed on May 17, 2019, provisional application No. 62/850,809, filed on May 21, 2019.

(51) Int. Cl.

| | | |
|---|---|---|
| *F02C 6/00* | (2006.01) | |
| *F02C 6/16* | (2006.01) | |
| *F02C 7/22* | (2006.01) | |
| *F02C 7/236* | (2006.01) | |
| *F02C 9/32* | (2006.01) | |
| *F02C 9/42* | (2006.01) | |
| *F02C 7/232* | (2006.01) | |

(52) U.S. Cl.
CPC .............. *F02C 7/228* (2013.01); *F02C 7/232* (2013.01); *F02C 7/236* (2013.01); *F02C 9/32* (2013.01); *F02C 9/42* (2013.01)

(56) References Cited

U.S. PATENT DOCUMENTS

| | | |
|---|---|---|
| 3,498,056 A | 3/1970 | Avery |
| 4,041,695 A | 8/1977 | Harper et al. |
| 5,809,771 A | 9/1998 | Wernberg |
| 6,050,081 A | 4/2000 | Jansen et al. |
| 6,125,624 A | 10/2000 | Prociw |
| 6,195,978 B1 | 3/2001 | Futa, Jr. |
| 6,244,034 B1 | 6/2001 | Taylor et al. |
| 6,385,962 B2 | 5/2002 | Futa, Jr. et al. |
| 6,484,510 B2 | 11/2002 | Futa, Jr. et al. |
| 6,877,306 B2 | 4/2005 | Wernberg et al. |
| 7,093,420 B2 | 8/2006 | Futa, Jr. et al. |
| 7,200,985 B2 | 4/2007 | Tuttle et al. |
| 7,874,310 B1 | 1/2011 | Jansen |
| 8,083,204 B2 | 12/2011 | Maker |
| 8,104,258 B1 | 1/2012 | Jansen et al. |
| 8,122,699 B2 | 2/2012 | Lawrence et al. |
| 8,353,306 B2 | 1/2013 | Futa et al. |
| 8,429,892 B2 | 4/2013 | Tentorio |
| 8,590,310 B2 | 11/2013 | Gibbons et al. |
| 9,261,025 B2 | 2/2016 | Dooley |
| 11,486,303 B2 * | 11/2022 | Shenouda ............... F02C 7/232 |
| 2003/0233823 A1 | 12/2003 | Futa et al. |
| 2009/0071119 A1 | 3/2009 | Kervistin et al. |
| 2016/0298850 A1 | 10/2016 | Chalaud |
| 2018/0283285 A1 | 10/2018 | Cheung |
| 2020/0049025 A1 | 2/2020 | Morgan et al. |

\* cited by examiner

3000 —

3100 — Operating the first gas turbine engine (FGTE) and the second gas turbine engine (SGTE) to drive the common load, the operating the SGTE including supplying fuel to a combustor of the SGTE by supplying fuel to a first fuel manifold and a second fuel manifold of the SGTE.

3200 — During the operating the FGTE and the supplying fuel to the combustor of the SGTE by the supplying fuel to the first fuel manifold of the SGTE: stopping the supplying fuel to the second fuel manifold of the SGTE.

3300 — During the operating the FGTE and the supplying fuel to the combustor of the SGTE by the supplying fuel to the first fuel manifold of the SGTE: flushing fuel in the second fuel manifold of the SGTE into the combustor of the SGTE by discharging pressurized air from an accumulator into the second fuel manifold of the SGTE.

FIG. 5

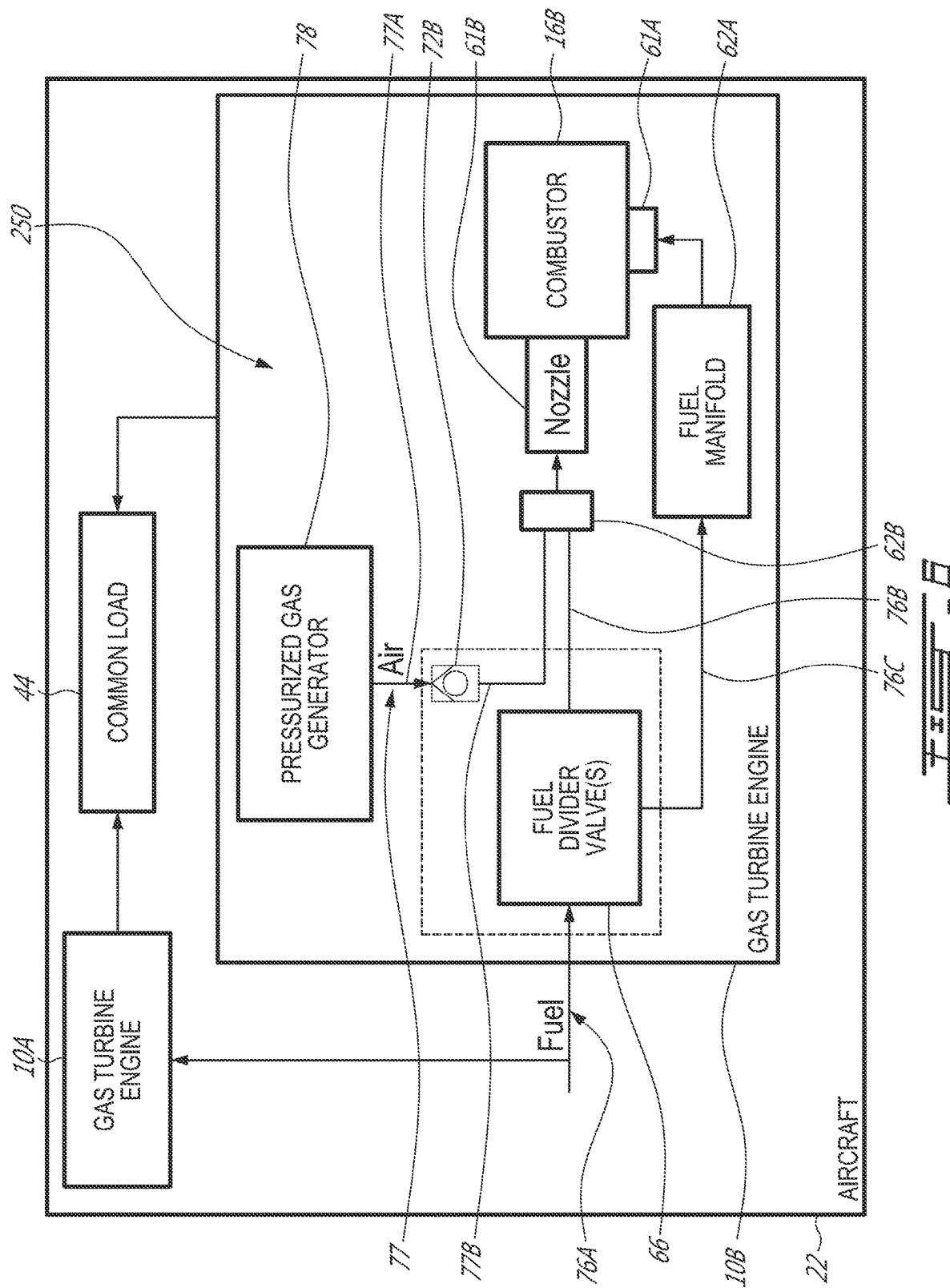

```
                                                    ┌─────────────────────────────────────────┐
┌──────────────────────────────────────┐            │ While operating the FGTE and supplying  │
│ Operating the first gas turbine      │            │ fuel to the combustor of the SGTE by    │
│ engine (FGTE) and the second gas     │  ┌───────────────────────────────────────┐  supplying │
│ turbine engine (SGTE) to drive the   │  │ While operating the FGTE and supplying│  fuel      │
│ common load, operating the SGTE      │──│ fuel to the combustor of the SGTE by  │──to the    │
│ including supplying fuel to a        │  │ supplying fuel to the second fuel     │  first fuel│
│ combustor of the SGTE by supplying   │  │ manifold of the SGTE, stopping        │  manifold  │
│ fuel to a first fuel manifold and a  │  │ supplying fuel to the first fuel      │  of the    │
│ second fuel manifold of the SGTE via │  │ manifold of the SGTE.                 │  SGTE,     │
│ a common flow divider valve.         │  └───────────────────────────────────────┘  supplying │
└──────────────────────────────────────┘            │ pressurized gas to the second fuel      │
                                                    │ manifold of the SGTE via the flow       │
                                                    │ divider valve to flush fuel in the      │
                                                    │ second fuel manifold into the           │
                                                    │ combustor of the SGTE.                  │
                                                    └─────────────────────────────────────────┘
```

Fig. 17

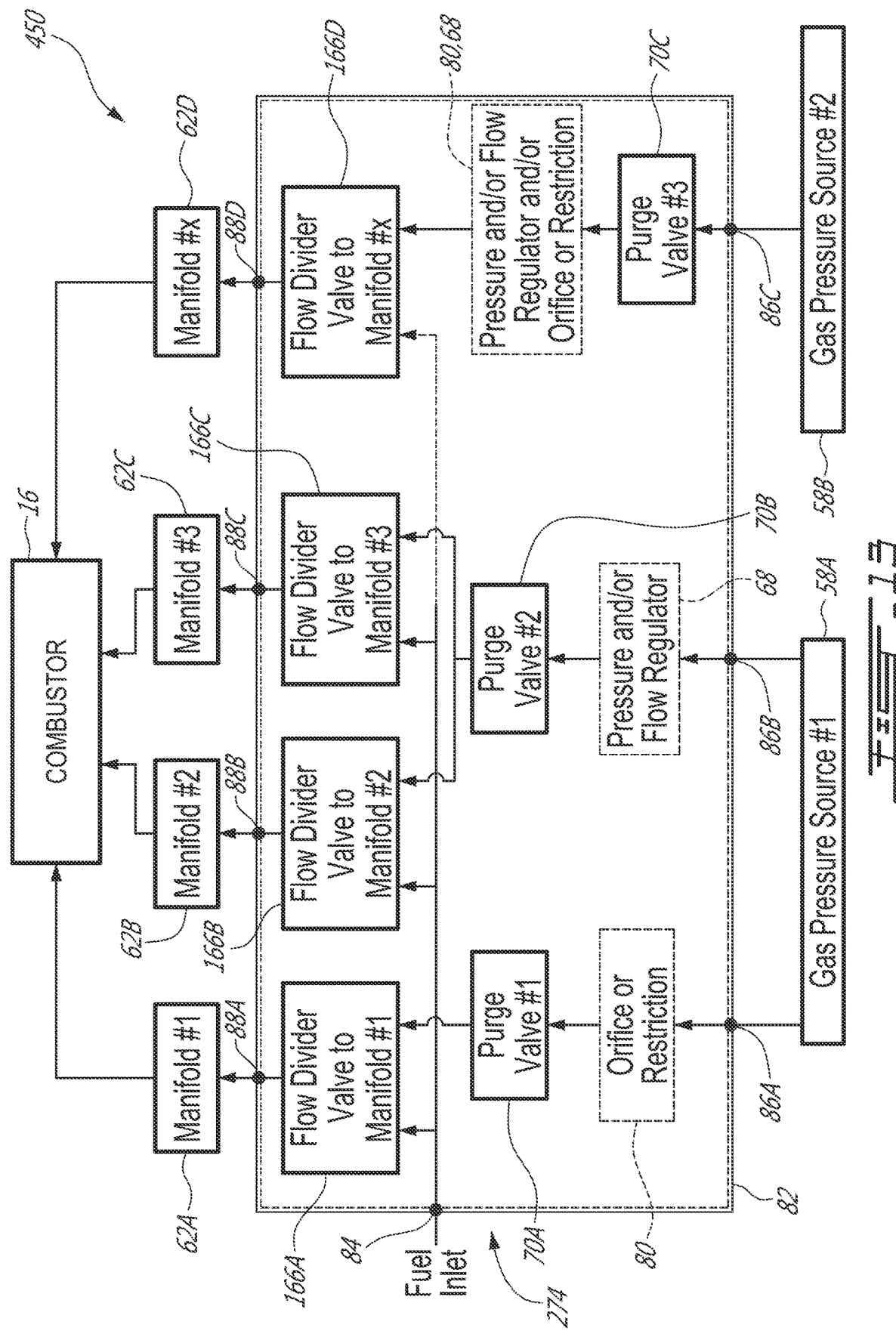

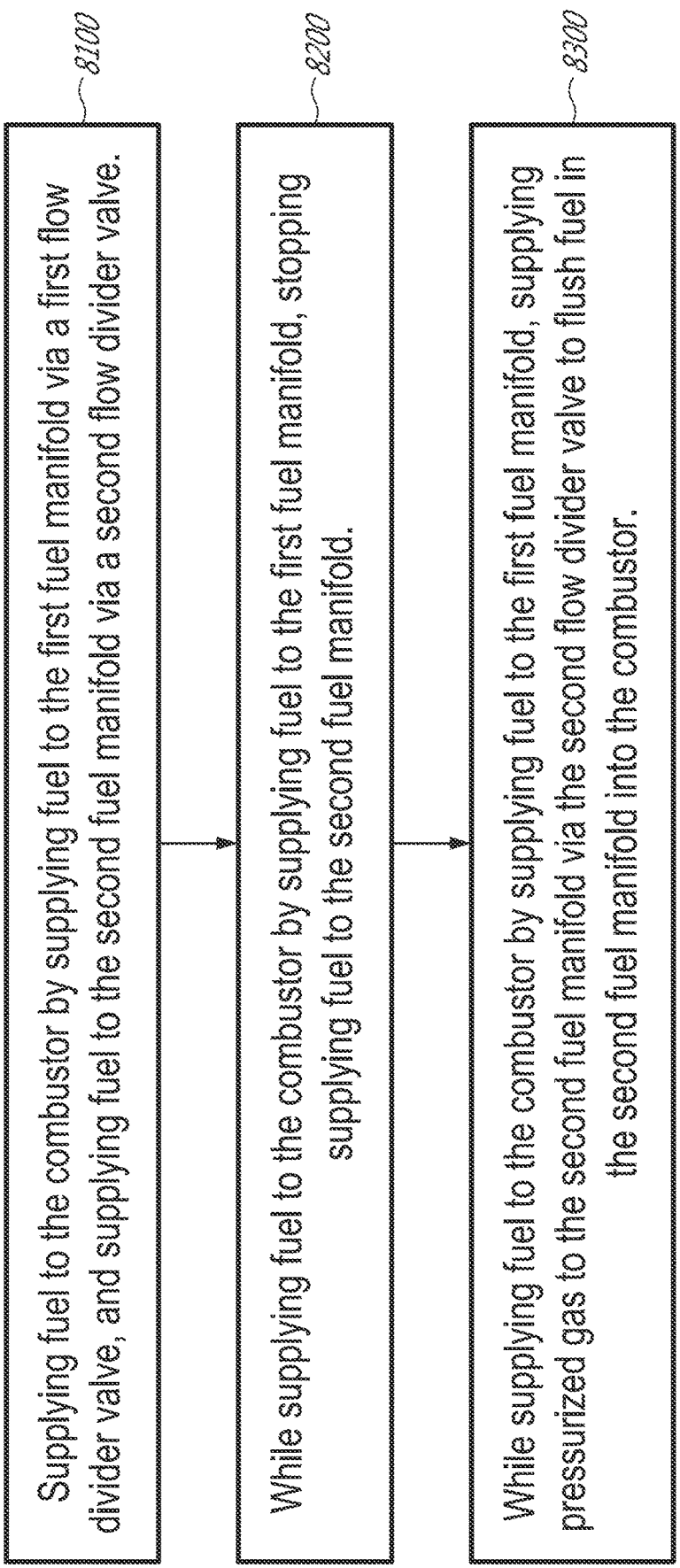

9000 — Operating the first gas turbine engine (FGTE) and the second gas turbine engine (SGTE) to drive the common load, operating the SGTE including: supplying fuel to a combustor of the SGTE by supplying fuel to a first fuel manifold of the SGTE via a first flow divider valve; and supplying fuel to the combustor by supplying fuel to a second fuel manifold of the SGTE via a second flow divider valve.

9200 — While operating the FGTE and supplying fuel to the combustor of the SGTE by supplying fuel to the first fuel manifold of the SGTE, stopping supplying fuel to the second fuel manifold of the SGTE.

9300 — While operating the FGTE and supplying fuel to the combustor of the SGTE by supplying fuel to the first fuel manifold of the SGTE, supplying pressurized gas to the second fuel manifold of the SGTE via the second flow divider valve to flush fuel in the second fuel manifold into the combustor of the SGTE.

Fig-15

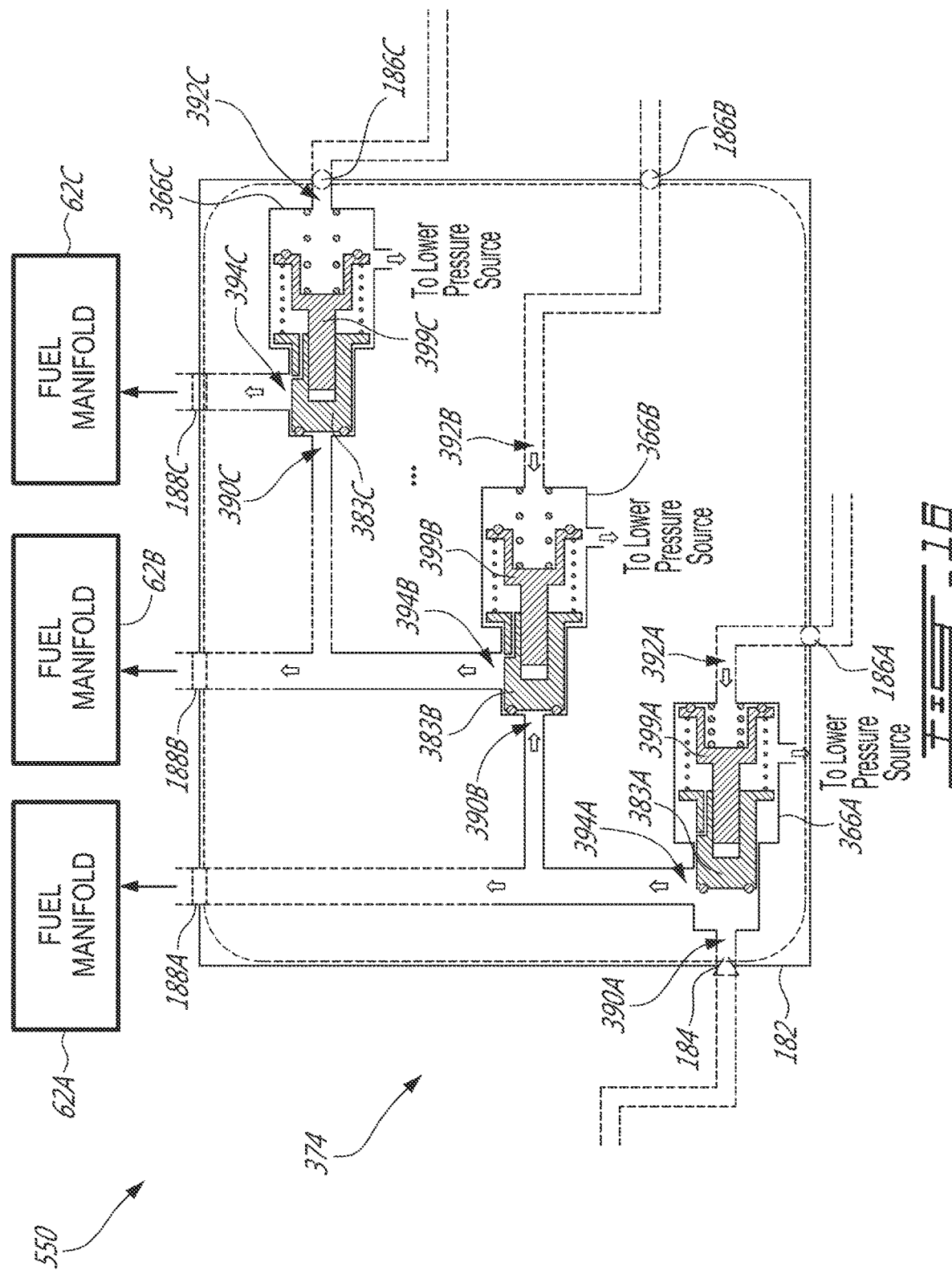

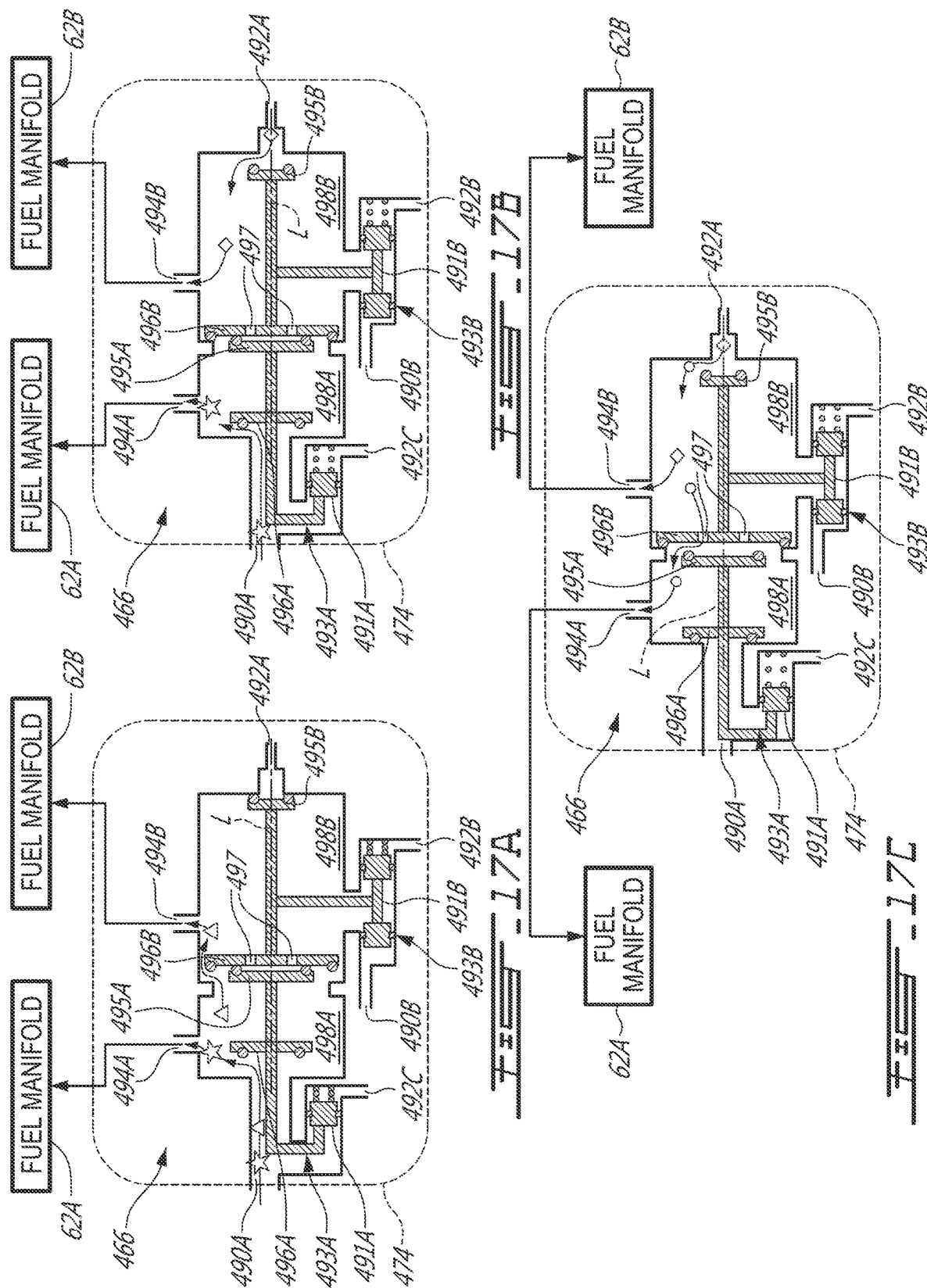

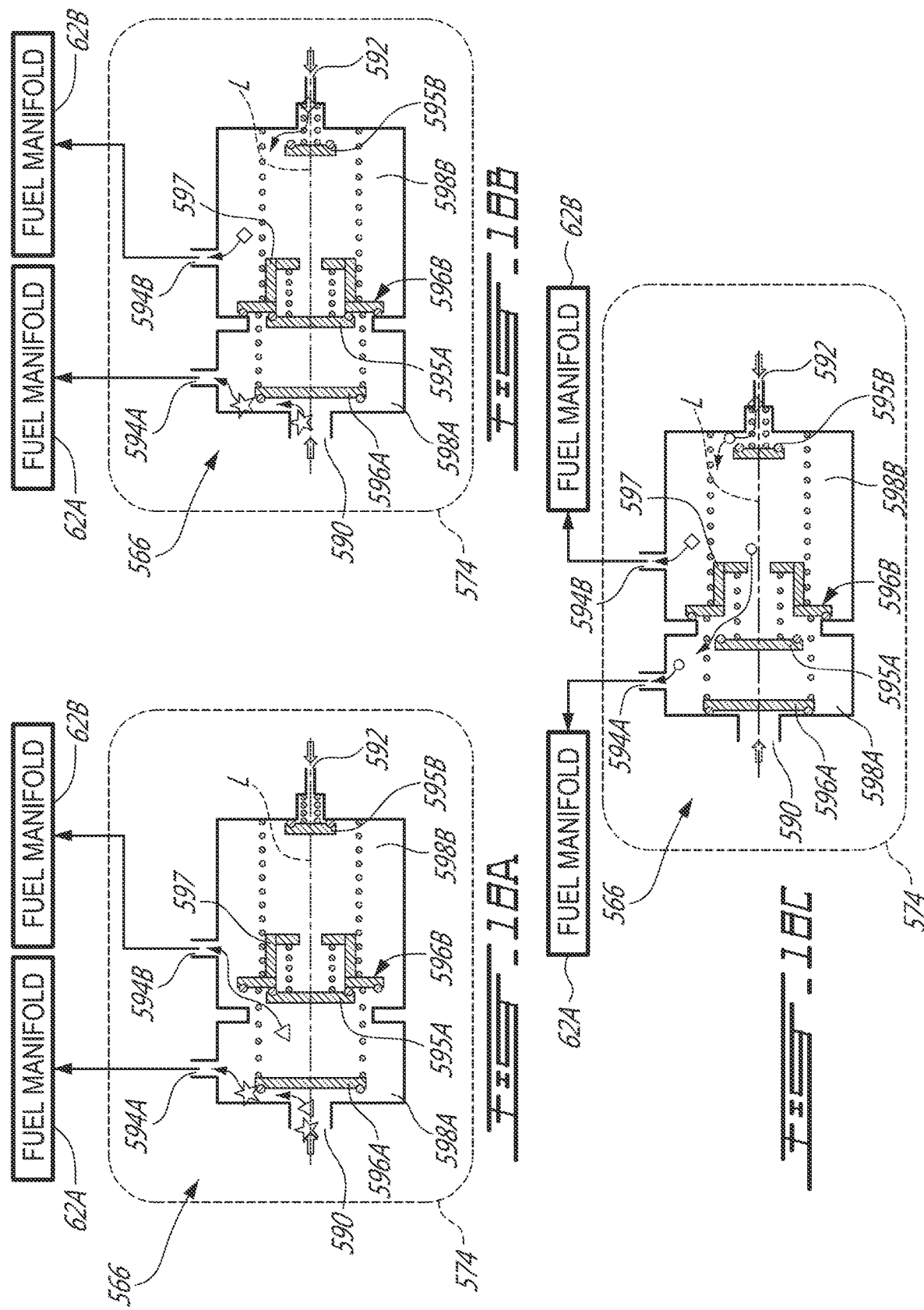

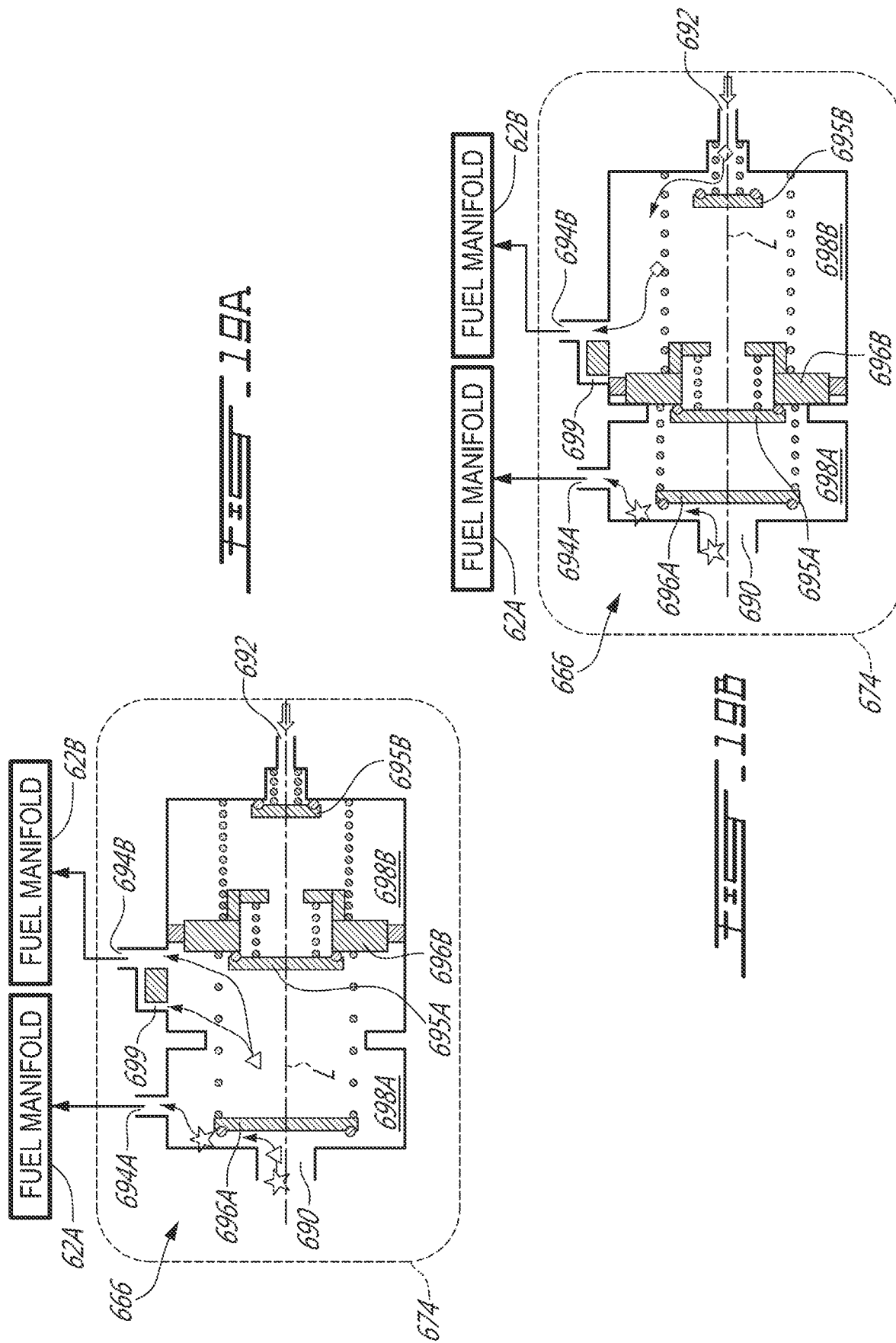

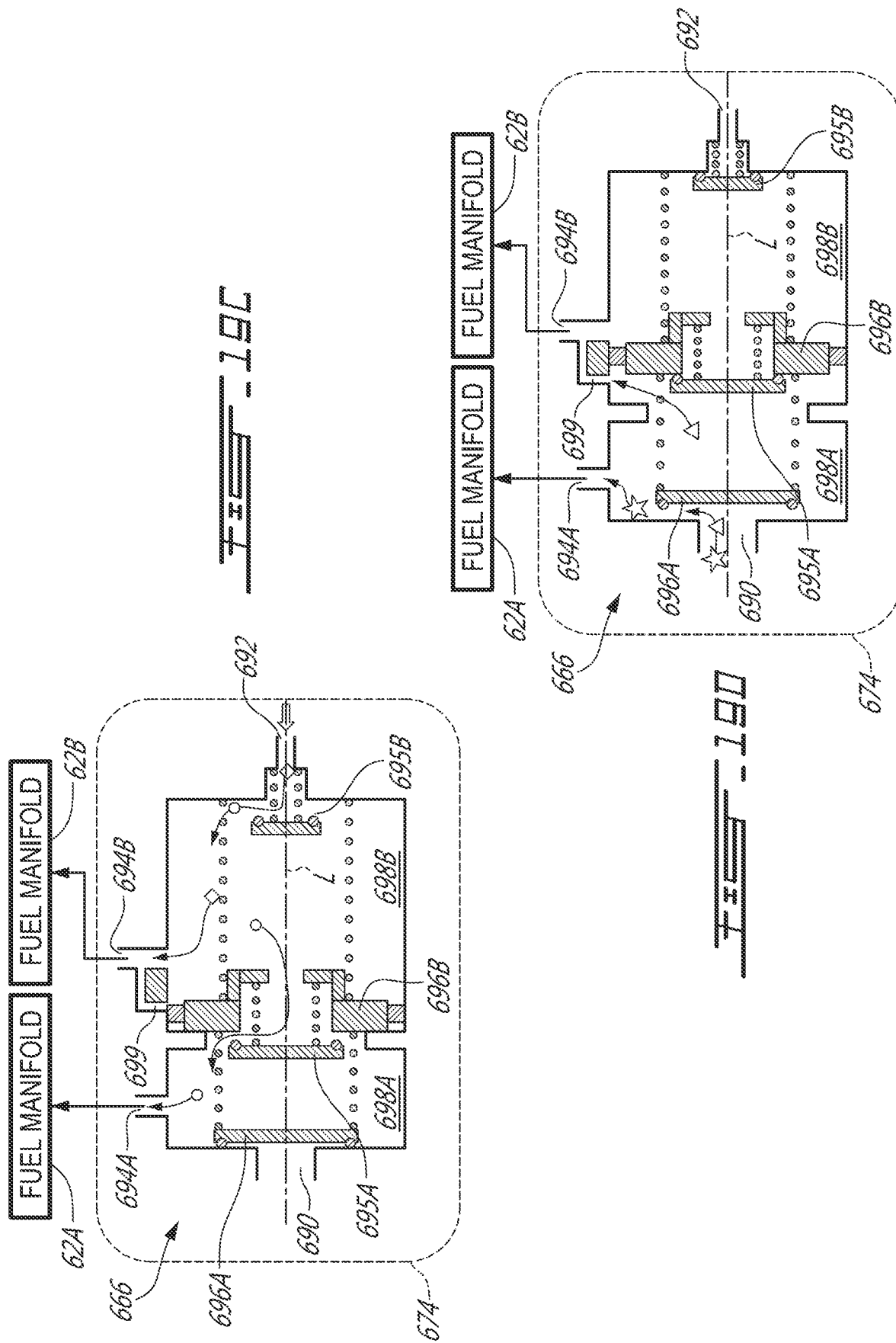

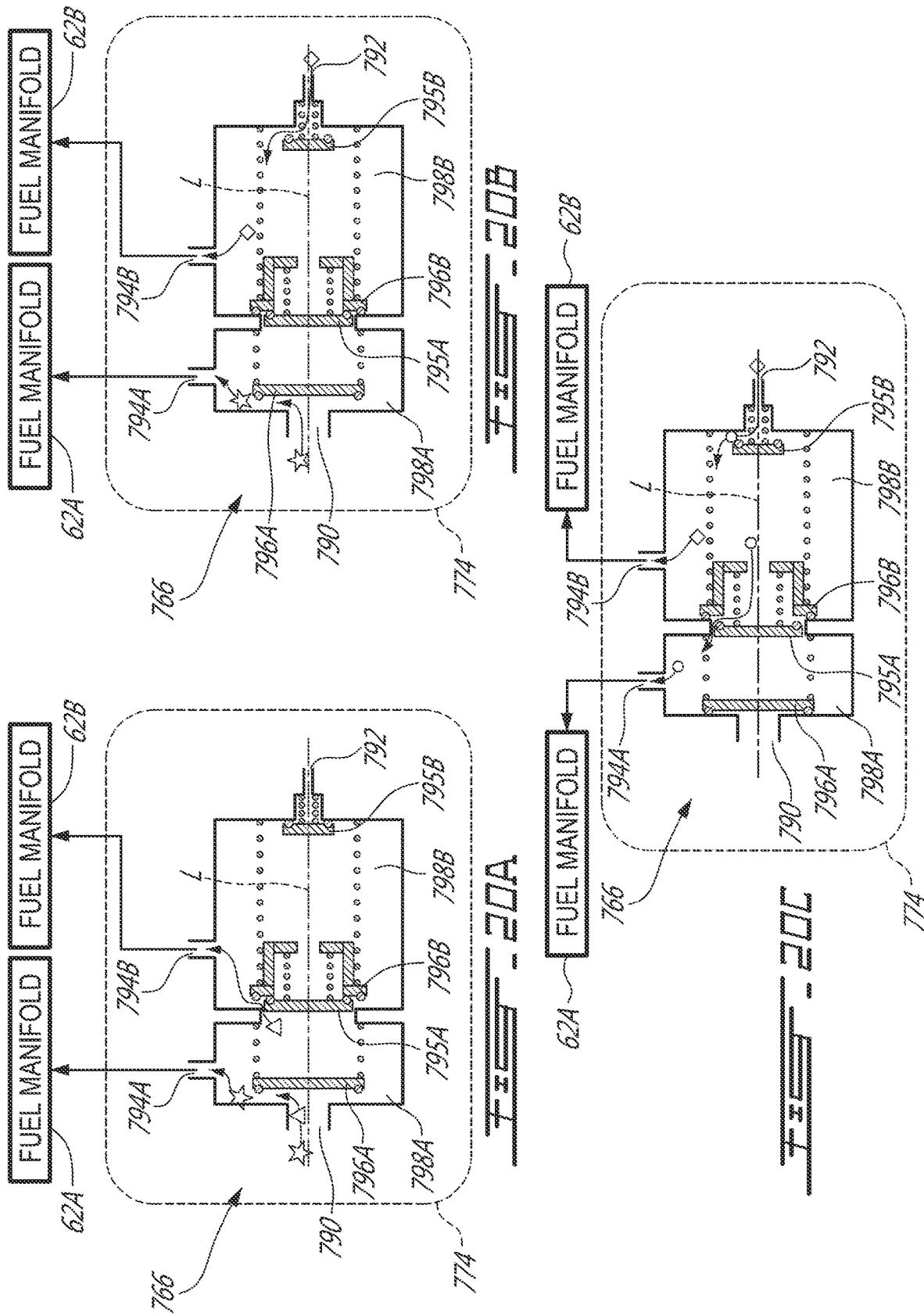

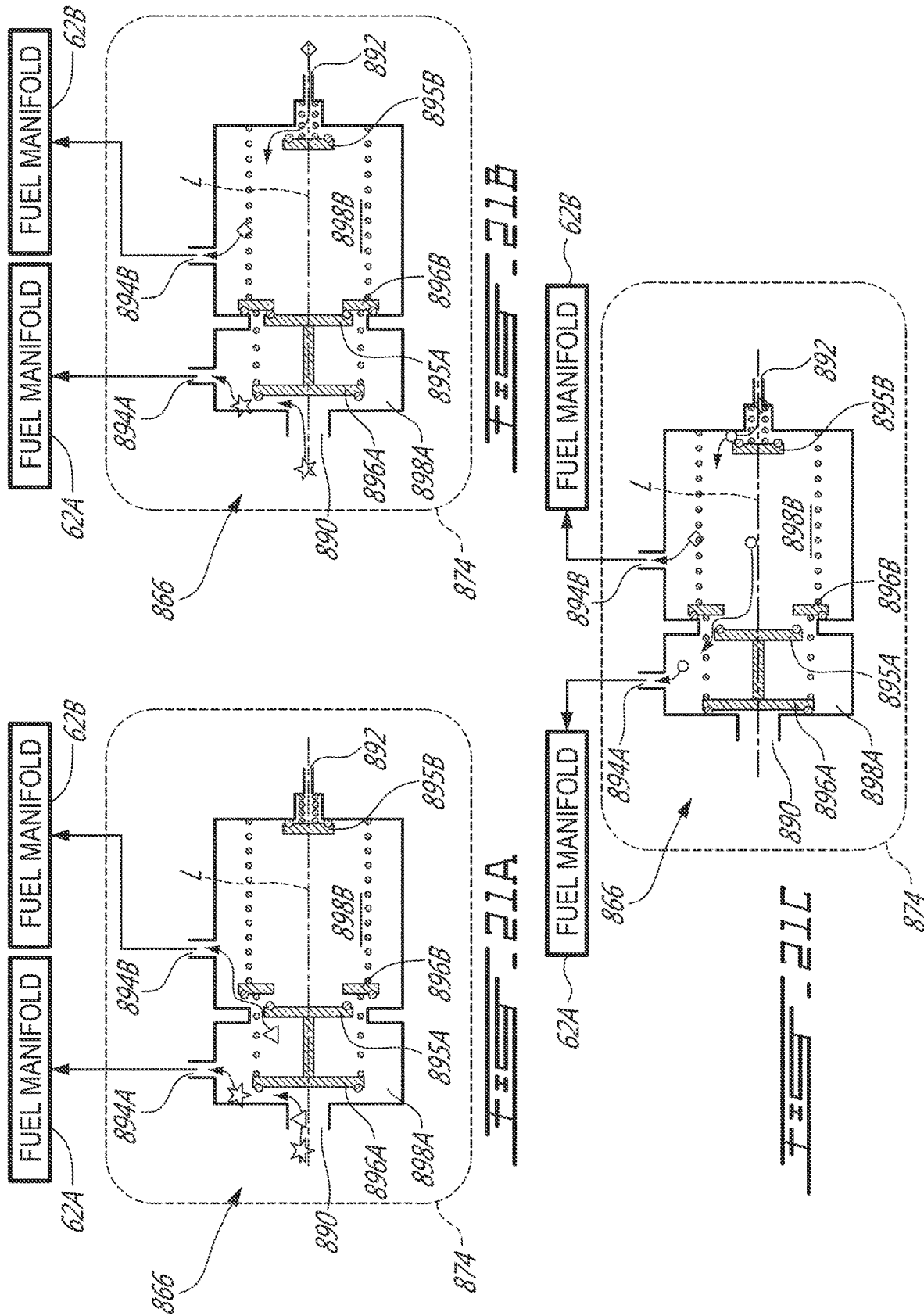

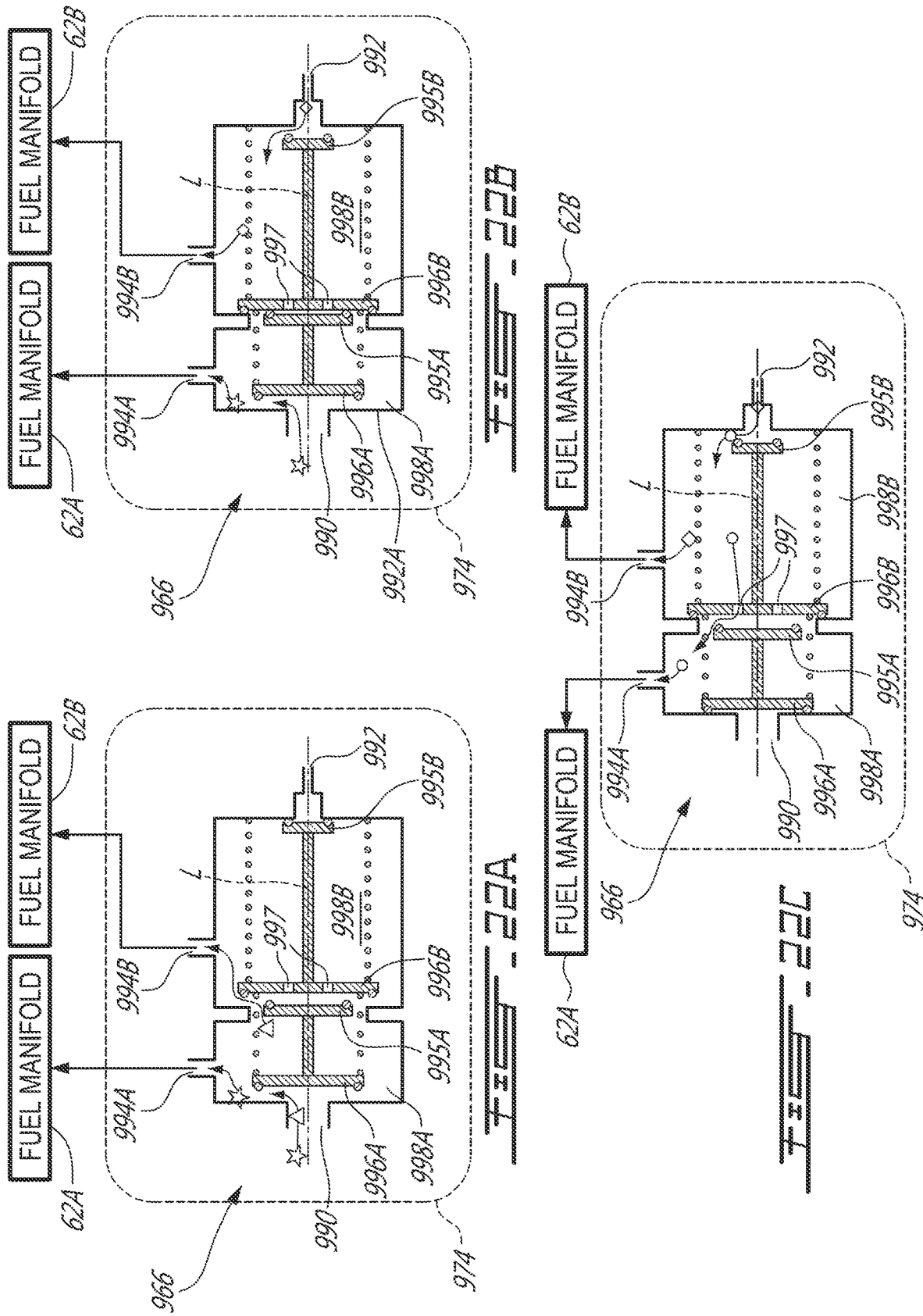

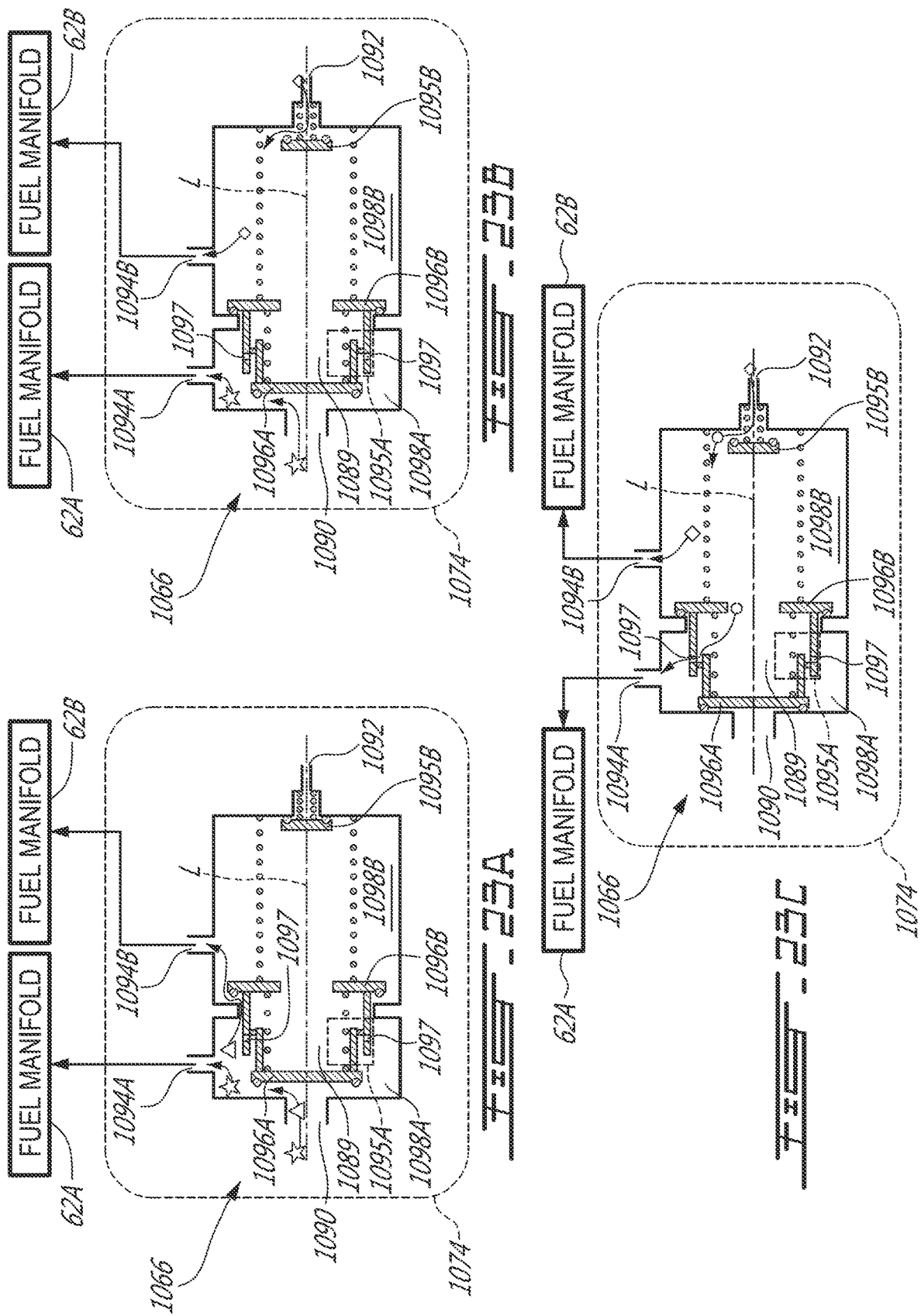

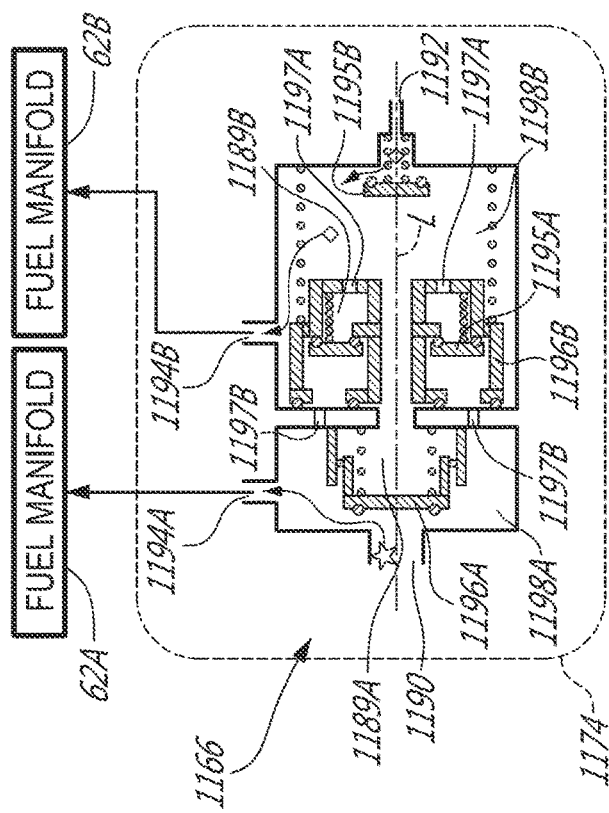
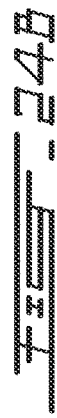
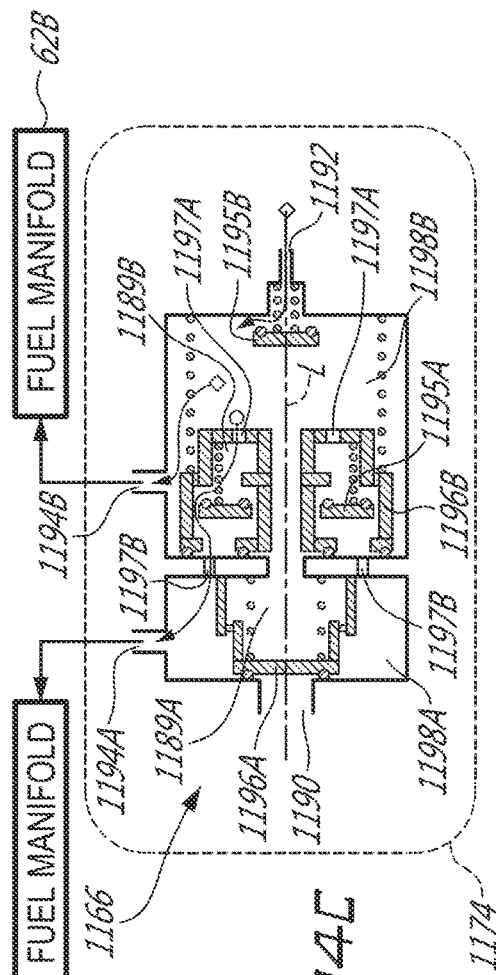
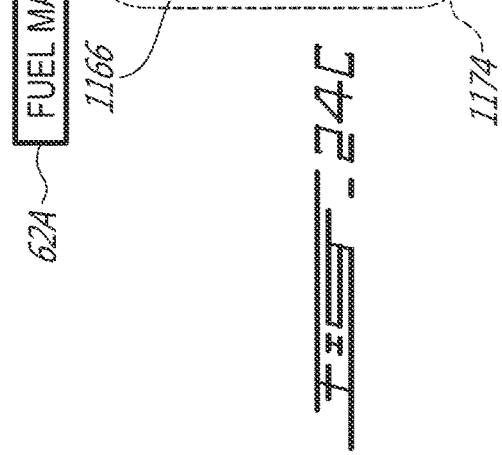

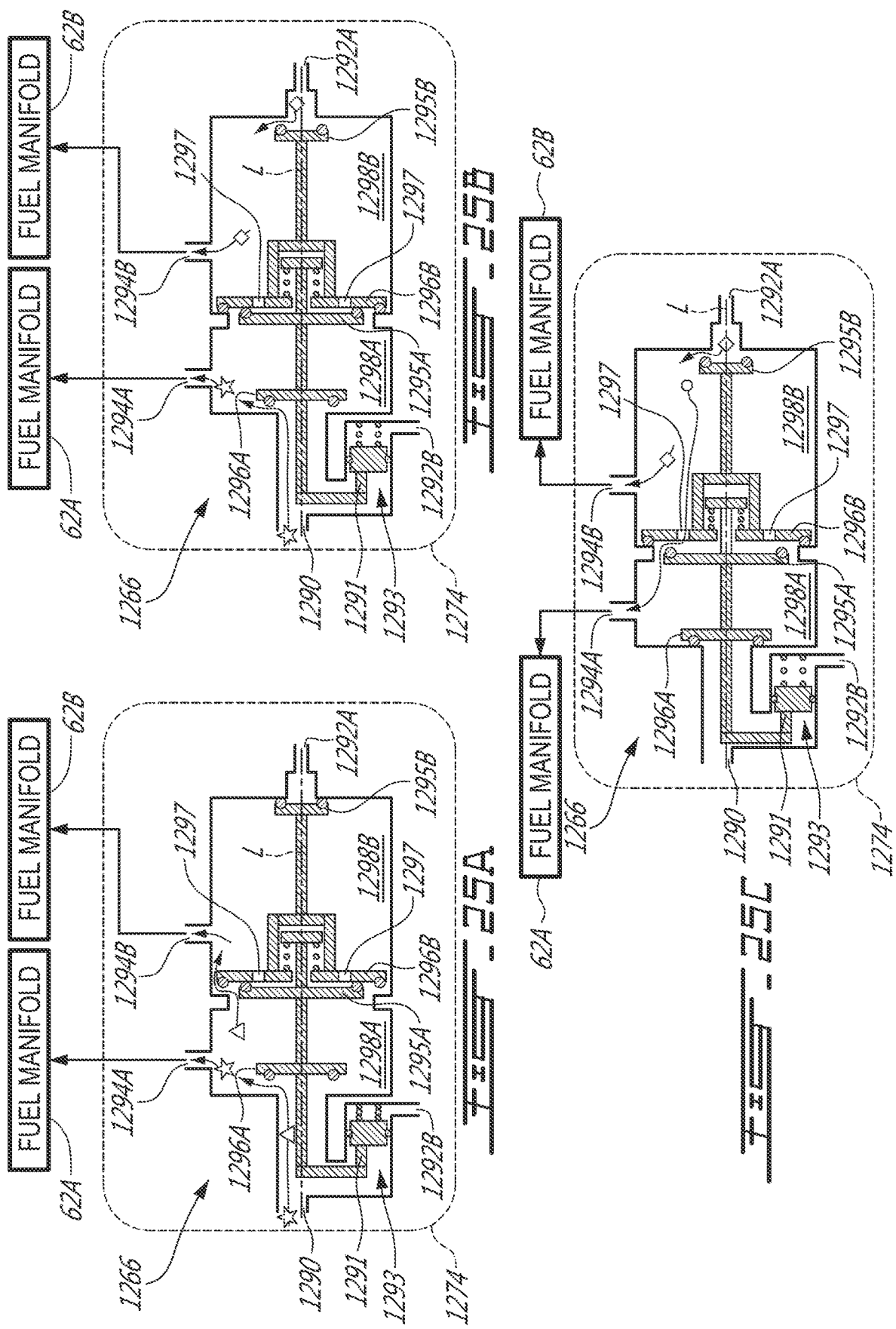

SYSTEM AND METHOD FOR PURGING A FUEL MANIFOLD OF A GAS TURBINE ENGINE THROUGH A FLOW DIVIDER VALVE

CROSS REFERENCE TO RELATED APPLICATIONS AND CLAIM OF PRIORITY

The present application is a division of U.S. patent application Ser. No. 16/871,130 filed on May 11, 2020 and incorporated herein by reference, which claims priority to: U.S. provisional patent application No. 62/848,187 filed on May 15, 2019 and incorporated herein by reference; U.S. provisional patent application No. 62/848,196 filed on May 15, 2019 and incorporated herein by reference; U.S. provisional patent application No. 62/848,223 filed on May 15, 2019 and incorporated herein by reference; U.S. provisional patent application No. 62/850,809 filed on May 21, 2019 and incorporated herein by reference; U.S. provisional patent application No. 62/848,231 filed on May 15, 2019 and incorporated herein by reference; and to U.S. provisional patent application No. 62/849,428 filed on May 17, 2019 and incorporated herein by reference.

TECHNICAL FIELD

The disclosure relates generally to gas turbine engines, and more particularly to the operation of gas turbine engines at low power conditions.

BACKGROUND OF THE ART

Twin-engine helicopters are provided with two turboshaft gas turbine engines. The outputs of both engines are connected to drive a main rotor of the helicopter via a reduction gearbox. Each of the engines is sized to account for a worst-case scenario of the other engine failing during take-off. Accordingly, the power rating of each engine is significantly greater than what is required for cruising.

During a cruise operating regime (phase of flight), operating only one of the two engines at a relatively high power regime instead of both engines at a lower power regime can provide better fuel efficiency. However, once a turboshaft engine is stopped, there is an amount of time required to restart the engine and have the engine running at a sufficient output power level to make up for a possible power drop of the other engine. Even though only one of the two engines may be required during the cruise operating regime, it is typically required for safety reasons that both engines remain operating at all times during flight. Accordingly, in an emergency condition such as a power drop in one of the two engines, this allows the other engine to rapidly increase its power output to provide power to make up for the power loss. However, having both engines operating at all times during flight can limit the gains in fuel efficiency. Also, further improvements in reliability and maintenance requirements are desirable.

SUMMARY

In one aspect, there is provided a method of operating a gas turbine engine, the gas turbine engine having a first fuel manifold and a second fuel manifold configured to supply fuel to a combustor of the gas turbine engine. The method comprises:

supplying fuel to the combustor by supplying fuel to the first and second fuel manifolds via a common flow divider valve; and while supplying fuel to the combustor by supplying fuel to the first fuel manifold via the common flow divider valve:

stopping supplying fuel to the second fuel manifold via the common flow divider valve; and flushing fuel in the second fuel manifold into the combustor by supplying pressurized gas to the second fuel manifold via the common flow divider valve.

In another aspect, there is provided a method of operating a multi-engine power plant of an aircraft, the multi-engine power plant including a first gas turbine engine (FGTE) and a second gas turbine engine (SGTE), the FGTE and SGTE being drivingly connected to a common load. The method comprises:

operating the FGTE and the SGTE to drive the common load, operating the SGTE including supplying fuel to a combustor of the SGTE by supplying fuel to a first fuel manifold and a second fuel manifold of the SGTE via a common flow divider valve;

while operating the FGTE and supplying fuel to the combustor of the SGTE by supplying fuel to the first fuel manifold of the SGTE via the common flow divider valve:

stopping supplying fuel to the second fuel manifold of the SGTE via the common flow divider valve, and supplying pressurized gas to the second fuel manifold of the SGTE via the common flow divider valve to flush fuel in the second fuel manifold into the combustor of the SGTE.

In a further aspect, there is provided a fuel system of a gas turbine engine. The fuel system comprises:

a first fuel manifold fluidly connectable to a combustor of the gas turbine engine;

a second fuel manifold fluidly connectable to the combustor; and a flow divider valve actuatable between a first configuration and a second configuration, wherein in the first configuration, the flow divider valve is configured to supply fuel to the first and second fuel manifolds; and in the second configuration, the flow divider valve is configured to:

supply fuel to the first fuel manifold, stop supplying fuel to the second fuel manifold, and permit pressurized gas to be supplied to the second fuel manifold to flush fuel in the second fuel manifold into the combustor.

In a further aspect, there is provided a method of operating a gas turbine engine. The method comprises:

supplying fuel to a combustor of the gas turbine engine by supplying fuel to a fuel manifold in fluid communication with the combustor;

stopping supplying fuel to the fuel manifold; and flushing fuel in the fuel manifold into the combustor by:

supplying purging gas to the fuel manifold; and maintaining a fuel flow rate to the combustor via the fuel manifold below a threshold by regulating the purging gas supplied to the fuel manifold.

DESCRIPTION OF THE DRAWINGS

Reference is now made to the accompanying figures in which:

FIG. 5 is a flowchart of an exemplary method of operating a multi-engine power plant of an aircraft;

FIG. 6 is a schematic illustration of another exemplary fuel system of a gas turbine engine;

FIG. 12 is a flowchart of another exemplary method of operating a multi-engine power plant;

FIG. 13 is a schematic illustration of another exemplary fuel system of a gas turbine engine;

FIG. 14 is a flowchart of another exemplary method of operating a gas turbine engine;

FIG. 15 is a flowchart of another exemplary method of operating a multi-engine power plant;

FIG. 16 is a schematic cross-sectional view of another fuel system of a gas turbine engine;

FIGS. 17A-17C are schematic cross-sectional views of an exemplary flow divider valve in first, second and third configurations respectively;

FIGS. 18A-18C are schematic cross-sectional views of another exemplary flow divider valve in first, second and third configurations respectively;

FIGS. 19A-19D are schematic cross-sectional views of another exemplary flow divider valve in first, second, third and fourth configurations respectively;

FIGS. 20A-20C are schematic cross-sectional views of another exemplary flow divider valve in first, second and third configurations respectively;

FIGS. 21A-21C are schematic cross-sectional views of another exemplary flow divider valve in first, second and third configurations respectively;

FIGS. 22A-22C are schematic cross-sectional views of another exemplary flow divider valve in first, second and third configurations respectively;

FIGS. 23A-23C are schematic cross-sectional views of another exemplary flow divider valve in first, second and third configurations respectively;

FIGS. 24A-24C are schematic cross-sectional views of another exemplary flow divider valve in first, second and third configurations respectively; and FIGS. 25A-25C are schematic cross-sectional views of another exemplary flow divider valve in first, second and third configurations respectively.

DETAILED DESCRIPTION

Figure 1:
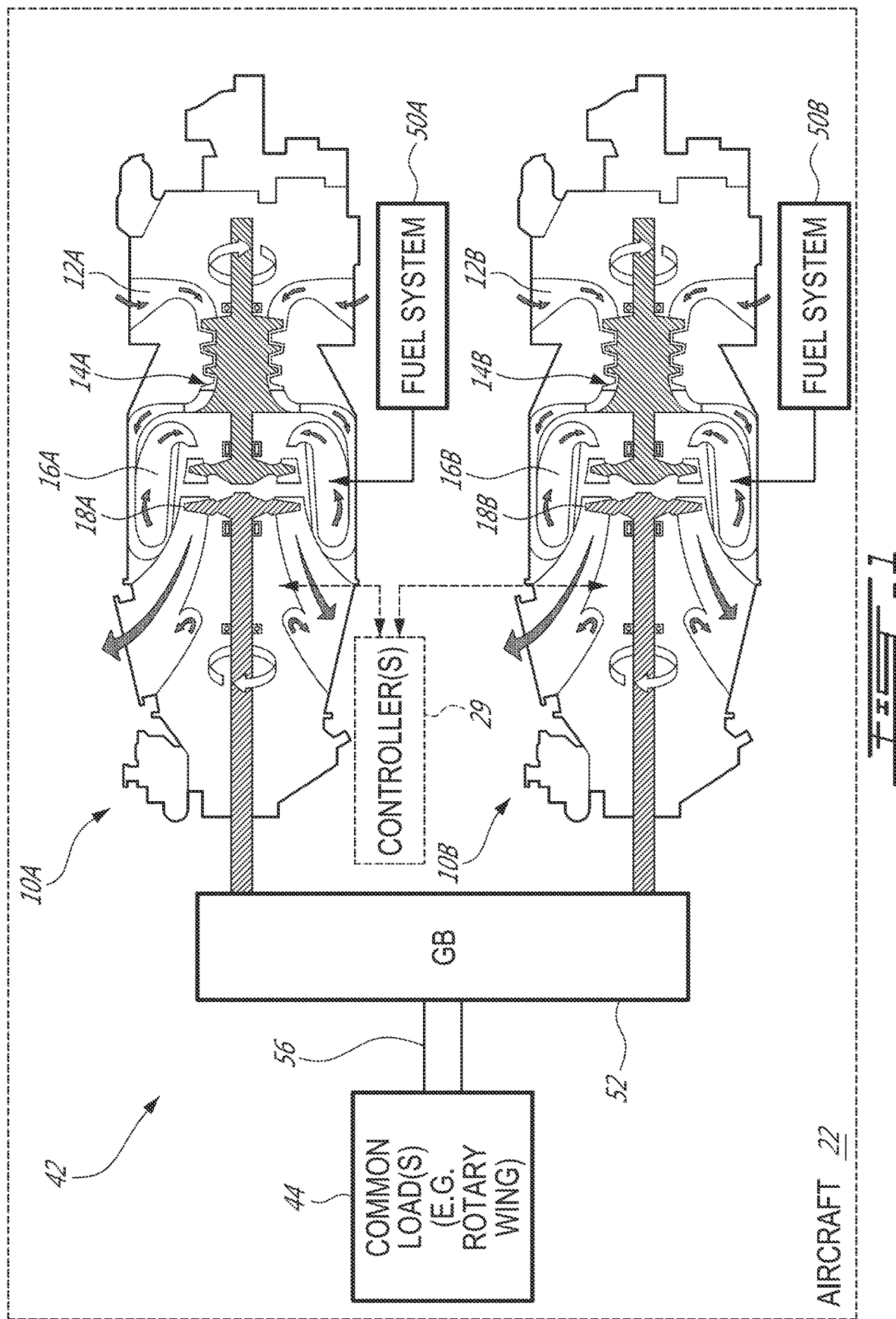
FIG. 1 is a schematic cross-sectional view of a multi-engine power plant including a fuel system as described herein.

FIG. 1 schematically illustrates an exemplary multi-engine (e.g., twin-pack) power plant 42 that may be used for an aircraft 22, which may be a rotorcraft such as a helicopter. The multi-engine power plant 42 may include two or more GTEs 10A, 10B. The first gas turbine engine 10A is referred hereinafter as "FGTE 10A" and the second gas turbine engine 10B is referred hereinafter as "SGTE 10B". In some instances FTGE 10A and/or SGTE 10B may be referred generically as GTE 10 or GTEs 10A, 10B. In the case of a helicopter application, these GTEs 10A, 10B may be turboshaft engines. However, it is understood that methods, systems and components disclosed herein are applicable to other types of aircraft engines such as turbofans and turboprops for example.

FIG. 1 shows axial cross-section views of two exemplary GTEs 10A, 10B of the turboshaft type. Each of the GTEs 10A, 10B may comprise, in serial flow communication, respectively, air intake 12A, 12B through which ambient air is received, multistage compressor section 14A, 14B (referred generically as "compressor section 14") for pressurizing the air, combustor 16A, 16B (referred generically as "combustor 16") in which the pressurized air is mixed with fuel and ignited for generating an annular stream of hot combustion gases, and one or more turbines 18A, 18B for extracting energy from the combustion gases. In some embodiments, GTEs 10A, 10B may be of the same type and power output rating.

Control of the multi-engine power plant 42 is effected by one or more controller(s) 29, which may be full authority digital engine controller(s) (FADEC(s)), electronic engine controller(s) (EEC(s)), or the like, that is/are programmed to manage, as described herein below, the operation of the GTEs 10A, 10B to reduce an overall fuel burn, particularly during sustained cruise operating regimes, wherein the aircraft 22 is operated at a sustained (steady-state) cruising speed and altitude. The cruise operating regime is typically associated with the operation of prior art engines at equivalent part-power, such that each engine contributes approximately equally to the output power of the power plant 42. Other phases of a typical helicopter mission include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions (cruise speed and altitude) are substantially stable, the GTEs 10A, 10B of the power plant 42 may be operated asymmetrically, with one engine operated in a high-power "active" mode and the other engine operated in a low power (which could be no power, in some cases) "standby" mode. Doing so may provide fuel saving opportunities to the aircraft 22, however there may be other suitable reasons why the GTEs 10A, 10B are desired to be operated asymmetrically. This operation management may therefore be referred to as an "asymmetric mode" or an "asymmetric operating regime", wherein one of the two GTEs 10A, 10B is operated in a low power (which could be no power, in some cases) "standby mode" while the other FGTE 10A or SGTE 10B is operated in a high-power "active" mode. In such an asymmetric operation, which is engaged for a cruise operating regime (continuous, steady-state flight which is typically at a given commanded constant aircraft cruising speed and altitude). The multi-engine power plant 42 may be used in an aircraft, such as a helicopter, but also has applications in suitable marine and/or industrial applications or other ground operations.

Referring still to FIG. 1, according to the present description, the multi-engine power plant 42 is driving, in this example, a helicopter and may be operated in this asymmetric manner, in which a first of the GTEs 10 (say, 10A) may be operated at high power in an active mode and the second of the GTEs 10 (10B in this example) may be operated in a low power (which could be no power, in some cases) standby mode. In one example, the FGTE 10A may be controlled by the controller(s) 29 to run at full (or near-full) power conditions in the active mode, to supply substantially all or all of a required power and/or speed demand of the common load 44. The SGTE 10B may be controlled by the controller(s) 29 to operate at low power or no-output-power conditions to supply substantially none or none of a required power and/or speed demand of the common load 44. Optionally, a clutch may be provided to declutch the low-power standby SGTE 10B. Controller(s) 29 may control the engine's governing on power according to an appropriate schedule or control regime. The controller (s) 29 may comprise a first controller for controlling the FGTE 10A and a second controller for controlling the SGTE 10B. The first controller and the second controller may be in communication with each other in order to implement the operations described herein. In some embodiments, a single controller 29 may be used for controlling the first FGTE 10A and the SGTE 10B.

In another example, an asymmetric operating regime of the GTEs 10A, 10B may be achieved through the one or more controller's 29 differential control of fuel flow to the GTEs 10A, 10B, as described in U.S. Patent Publication no. US 2020/0049025 A1 titled "MULTI-ENGINE SYSTEM AND METHOD", the entire contents of which are incorporated herein by reference. Low fuel flow may also include zero fuel flow in some examples.

Although various differential control between the GTEs 10A, 10B of the engine power plant 42 are possible, in one particular embodiment the controller(s) 29 may correspondingly control fuel flow rate to each GTE 10A, 10B accordingly. In the case of the standby SGTE 10B, a fuel flow (and/or a fuel flow rate) provided to the standby SGTE 10B may be controlled to be between 70% and 99.5% less than the fuel flow (and/or the fuel flow rate) provided to the active FGTE 10A. In the asymmetric mode, the standby SGTE 10B may be maintained between 70% and 99.5% less than the fuel flow to the active FGTE 10A. In some embodiments of the systems and methods disclosed herein, the fuel flow rate difference between the active and standby GTEs 10A, 10B may be controlled to be in a range of 70% and 90% of each other, with fuel flow to the standby SGTE 10B being 70% to 90% less than the active FGTE 10A. In some embodiments, the fuel flow rate difference may be controlled to be in a range of 80% and 90%, with fuel flow to the standby SGTE 10B being 80% to 90% less than the active FGTE 10A.

In another embodiment, the controller 29 may operate one engine (say SGTE 10B) of the multi-engine power plant 42 in a standby mode at a power substantially lower than a rated cruise power level of the SGTE 10B, and in some embodiments at substantially zero output power and in other embodiments less than 10% output power relative to a reference power (provided at a reference fuel flow). Alternately still, in some embodiments, the controller(s) 29 may control the standby SGTE 10B to operate at a power in a range of 0% to 1% of a rated full-power of the standby SGTE 10B (i.e. the power output of the standby SGTE 10B to the common gearbox 52 remains between 0% to 1% of a rated full-power of the standby SGTE 10B when the standby SGTE 10B is operating in the standby mode).

In another example, the multi-engine power plant 42 of FIG. 1 may be operated in an asymmetric operating regime by control of the relative speed of the GTEs 10A, 10B using controller(s) 29, that is, the standby SGTE 10B is controlled to a target low speed and the active FGTE 10A is controlled to a target high speed. Such a low speed operation of the standby SGTE 10B may include, for example, a rotational speed that is less than a typical ground idle speed of the engine (i.e. a "sub-idle" engine speed). Still other control regimes may be available for operating the GTEs 10A, 10B in the asymmetric operating regime, such as control based on a target pressure ratio, or other suitable control parameters.

Although the examples described herein illustrate two GTEs 10A, 10B, asymmetric mode is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say FTGE 10A) may operate in the active mode while the other turboshaft engine (say SGTE 10B) may operate in the standby mode, as described above. During this asymmetric operation, if the helicopter needs a power increase (expected or otherwise), the SGTE 10B may be required to provide more power relative to the low power conditions of the standby mode, and possibly return immediately to a high- or full-power condition. This may occur, for example, in an emergency condition of the multi-engine power plant 42 powering the helicopter, wherein the active engine loses power and transitioning the standby engine from the low power condition to the high power condition may occur rapidly. Even absent an emergency, it will be desirable to repower the standby engine to exit the asymmetric mode.

During the low power (standby) operation or shutdown of a GTE 10, fuel flow rates through one or more fuel manifolds feeding fuel to fuel nozzles of the GTE 10 may need to be lowered significantly or stopped. If sufficiently low or stopped, residual or slow flowing fuel in the respective fuel manifolds and nozzles may form soot due to exposure to high combustor temperatures or direct combustion. Such type of soot formation is called coking and can degrade performance of the nozzles and fuel manifolds by clogging fuel flow pathways with carbon deposits over time. One or both of the GTEs 10A, 10B may include a fuel system 50A, 50B that is configured to mitigate and/or hinder such coking. Various embodiments of such fuel system, associated methods and components are described herein. The low-power (standby) operation may include non-shutting down, continued operation, and/or sustained operation of a GTE 10.

Figure 2:
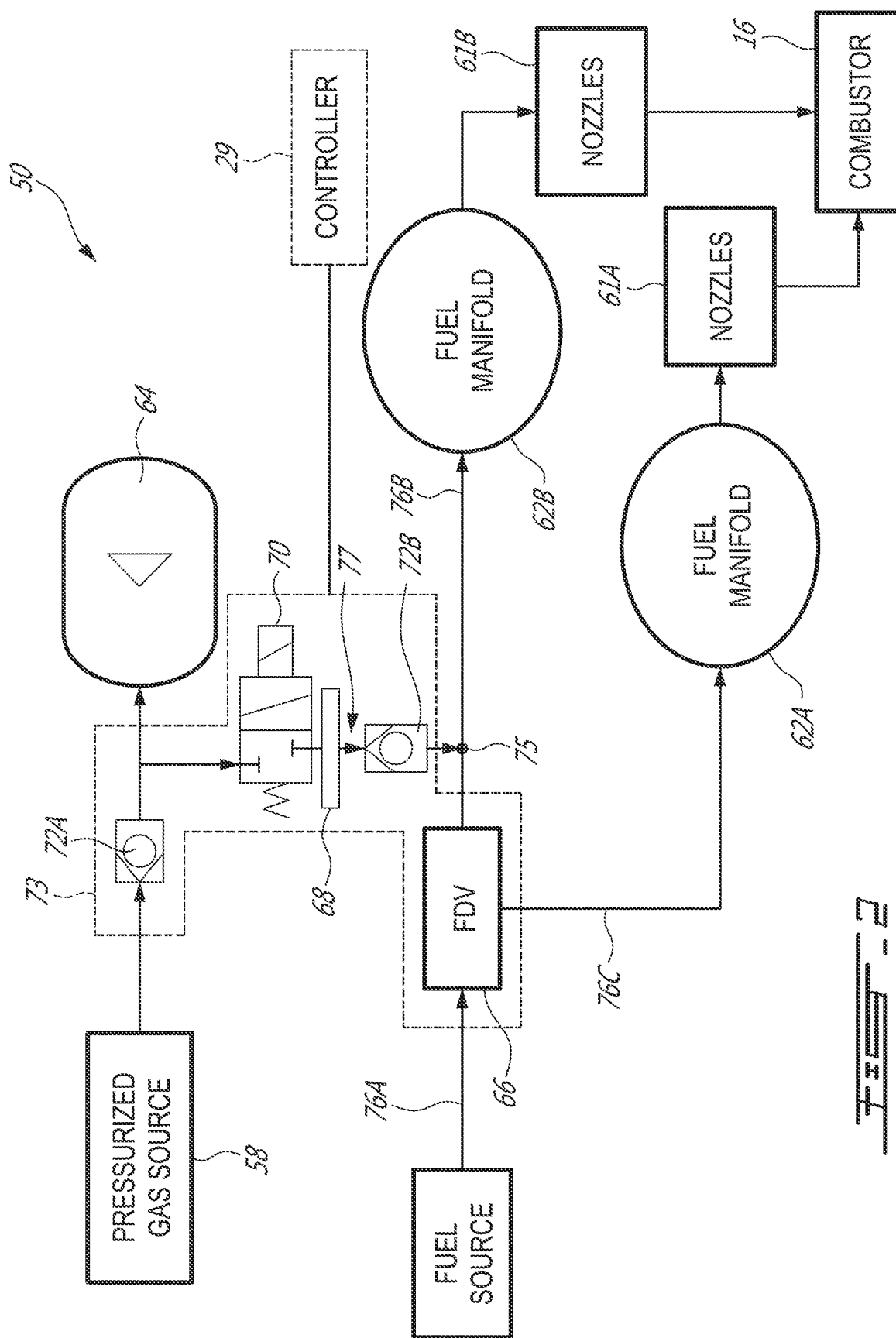
FIG. 2 is a schematic illustration of an exemplary fuel system of a gas turbine engine.

FIG. 2 is a schematic illustration of an exemplary fuel system 50 (e.g., fuel system 50A and/or fuel system 50B) of a GTE 10 (e.g., FGTE 10A and/or SGTE 10B) mounted to the aircraft 22. The fuel system 50 may include a first fuel manifold 62A fluidly connected to and configured to supply fuel to a combustor 16 of the GTE 10, and also a second fuel manifold 62B fluidly connected to and configured to supply fuel to the same combustor 16. In some embodiments, the fuel manifolds 62A, 62B may supply fuel to the combustor 16 via respective one or more sets of fuel nozzles 61A, 61B opening into the combustor 16. In some embodiments, first and second sets of fuel nozzles 61A, 61B may be substantially the same or different. In some operating situations, different amounts of fuel may be supplied to the first and second fuel manifolds 62A, 62B.

The fuel system 50 may include an arrangement 73 of valves including one or more flow divider valves 66 that may or may not be part of a valve assembly. The flow divider valve 66 may be a hydraulic device, an electronic device or an electronically-controlled hydraulic device that can separate a flow into two or more parts, e.g., according to a predetermined schedule. The arrangement 73 and/or flow divider valve 66 may comprise one or more embodiments of (flow divider) valves, or assemblies, described herein, such as embodiments described in FIGS. 16-25C.

The arrangement 73 of valves may include one or more valves and be configurable (e.g., actuatable) between a first configuration and a second configuration. The arrangement 73 of valves may include one or more purge valves 70, which may include a solenoid-operated valve, one or more (e.g., a plurality) of one-way valves 72A, 72B, an optional (pressure or flow) regulator 68, a flow divider valve 66, flow diverter valve(s), and/or any other flow control device(s) configured to permit/stop/regulate fluid flow or pressure across the arrangement 73 of valves. The arrangement 73 of valves may be configured to supply fuel to the first and second fuel manifolds 62A, 62B in the first configuration of the arrangement 73 of valves. The arrangement 73 of valves may be configured to supply fuel to the first fuel manifold 62A and stop supplying fuel to the second fuel manifold 62B in the second configuration.

The first configuration of the arrangement 73 of valves may be adopted during a high-power "active" mode of the GTE 10. The first configuration may facilitate operating the multi-engine power plant 42 at high or intermediate power levels during flight, i.e. wherein all or most of the engines of the multi-engine power plant 42 receive fuel and produce significant and useful work to drive the common load 44 (shown in FIG. 1).

The second configuration of the arrangement 73 of valves may be adopted during the low power "standby" mode of the GTE 10. The second configuration may facilitate operating the multi-engine power plant 42 in the asymmetric operating regime described above. The second configuration of the arrangement 73 of valves may be used to bring the GTE 10 to the standby mode of operation by supplying fuel to the combustor 16 via only the first fuel manifold 62A and not via the second fuel manifold 62B. In some situations, the use of only one (or some) of the fuel manifolds 62A, 62B may require less fuel to keep the standby GTE 10 running in the standby mode as opposed to having to keep fuel flowing to all of the fuel manifolds 62A, 62B of the standby GTE 10.

The fuel system 50 may include an accumulator 64 (e.g., reservoir, pressure vessel) configured to store pressurized air (or other suitable pressurized gas). In the second configuration of the arrangement 73 of valves, the accumulator 64 may fluidly connect to the second fuel manifold 62B to discharge pressurized air (e.g., allow flow of pressurized air) into the combustor 16 via the second fuel manifold 62B to flush (push) residual fuel in the second fuel manifold 62B (and/or fuel nozzles 61B) into the combustor 16 after fuel supply to the second fuel manifold 62B has been stopped.

The fuel system 50 may comprise a fuel line 76B establishing fluid communication between a first of the one or more valves (e.g., one-way valve 72B or flow divider valve 66 in the arrangement 73 of valves) and the second fuel manifold 62B. The fuel source may be configured to provide fuel flow to the first and second fuel manifolds 62A, 62B via the upstream fuel line 76A and the flow divider valve 66. The flow divider valve 66 may supply fuel to the first fuel manifold 62A via the downstream fuel line 76C, and to the second fuel manifold 62B via the downstream fuel line 76B. A fuel pump (not shown) may be operatively disposed between the fuel source and the flow divider valve 66.

The accumulator 64 may be configured to discharge pressurized air into the downstream fuel line 76B at a location 75 downstream of the flow divider valve 66 in the second configuration of the arrangement 73 of valves.

The accumulator 64 may be configured to receive and charged with pressurized gas from a pressurized gas source 58 prior to the arrangement 73 of valves entering the second (purge) configuration. The pressurized gas source 58 may be a compressor section 14A or 14B of the GTE 10A or 10B and the pressurized gas may be pressurized air. The accumulator 64 may fluidly connect to the compressor section 14 to receive pressurized air from the compressor section 14. In some embodiments, pressurized air may be bleed air drawn from a gas path of GTE 10 at a location upstream of combustor 16. In some embodiments, pressurized gas source 58 may be another pressurized gas generator such as another compressor (e.g., pump) for example. For example, the accumulator 64 may be configured to receive relatively high-pressure air from a later or last stage of compression of the compressor section 14 of the same or another GTE 10. The charging of the accumulator 64 with pressurized air may be conducted while the soon-to-be standby GTE 10 is operating at a higher power output level so that the pressure inside the accumulator 64 may be higher than in the combustor 16 while purging the fuel at the lower power output level in order to enable purging of the fuel from the fuel manifold 62B (and/or fuel nozzles 61B) into the combustor 16 using the pressurized air inside the accumulator 64. Additionally, fuel system 50 may include one or more one-way valves 72B and/or one or more regulators 68 which may be configured to prevent backflows such as backflow of fuel and/or combustion gas from the fuel manifold 62B (and/or fuel nozzles 61B) toward the accumulator 64.

Flushing fuel from the fuel manifold 62B may include substantially emptying the fuel manifold 62B (and/or fuel nozzles 61B) of fuel. In some embodiments, flushing fuel from the fuel manifold 62B may include drying the fuel manifold 62B and fuel nozzles 61B. While the fuel manifold 62B is flushed of fuel and fuel supply thereto is stopped, continuing combustion in the combustor 16, e.g., fed by fuel flowing to the combustor 16 via the first fuel manifold 62A, may reduce the amount of coking in the second fuel manifold 62B and fuel nozzles 61B due to the lack of fuel inside the second fuel manifold 62B and fuel nozzles 61B. Thus, the second fuel manifold 62B may be kept empty of fuel during operation of the GTE 10 (e.g., during flight or a cruise regime during flight) in the standby mode without causing significant coking inside the second fuel manifold 62B and/or fuel nozzles 61B. Accordingly, in certain instances, when a minimal amount of fuel needed for sustaining combustion is supplied to the combustor 16 via the first fuel manifold 62A only, an energy efficient low power standby mode of the GTE 10 may be achieved without significant coking of the purged second fuel manifold 62B.

Since combustion is sustained in the combustor 16 via the first fuel manifold 62A, the standby GTE 10 may in some instances retain the ability to more quickly provide a demanded power increase via a rapid "spool-up", while minimizing or significantly reducing fuel consumption in intervening periods when such power is not required. Spooling-up of the GTE 10, or otherwise changing the operation of the GTE 10 away from the standby mode, may include changing a configuration of the arrangement 73 of valves to the first configuration described above.

In some embodiments, the fuel system 50 includes a controller 29. The controller 29 may be operatively coupled to the arrangement 73 of valves or to one or more of the components of the arrangement 73 of valves. In some embodiments, the controller 29 may trigger the purge valve 70 to open a gas pathway 77 between the accumulator 64 to the fuel manifold 62B to enable fuel purging therein by pressurized gas flowing thereto from the accumulator 64.

In some embodiments, the one-way valve 72A may be positioned between the pressurized gas source 58 (e.g., compressor section 14) and the accumulator 64. The one-way valve 72A may prevent backflow from the accumulator 64 to the pressurized gas source 58 in the event of a reduction in supply pressure of the pressurized gas source 58. In some embodiments, the one-way valve 72B may be positioned between the accumulator 64 and the fuel manifold 62B (e.g., upstream of downstream fuel line 76B in the gas pathway 77) to prevent fuel from flowing to the accumulator 64 and/or the pressurized gas source 58.

In some embodiments, the regulator 68 may be operatively disposed between the accumulator 64 and the fuel manifold 62B, downstream of the accumulator 64 and upstream of the fuel manifold 62B. In some embodiments, the regulator 68 may be a flow regulator configured to control flow/volume rate, or a pressure regulator configured to control a downstream (flow/fluid) pressure. The regulator 68 may allow control of the flow, e.g., it may prevent flow pressure from exceeding or falling below a certain pressure. In some embodiments, the regulator 68 may be a single stage pressure regulator. In some embodiments, the regulator 68 may be an electrically-controlled valve such as a solenoid valve. In various embodiments, regulator 68 may include any suitable means of flow regulation. In some embodiments, regulator 68 may be of a type suitable for maintaining or controlling a downstream pressure of gas delivered to the fuel manifold 62B.

In some embodiments, the fuel system 50 may be configured to control pressurized gas/air flow to the fuel manifold 62B (for flushing fuel into the combustor 16) in a manner that avoids engine surge caused by a fuel spike in the combustor 16. An engine surge may be a momentary (or longer lasting) increase in power output of the GTE 10. The fuel spike in the combustor 16 may be a relatively sudden (e.g., rapid, abrupt, sharp) increase of fuel flow to the combustor 16. The use of the regulator 68 may prevent or reduce the likelihood of the occurrence of such fuel spike. For example, the regulator 68 may prevent a sudden burst of pressurized air from being discharged into the fuel manifold 62B which could cause such fuel spike. For example, the regulator 68 may help maintain a fuel flow rate (flow rate of fuel) to the combustor via the fuel manifold 62B below a threshold during purging. In other words, the fuel flow rate may be prevented from exceeding the threshold during purging. The threshold may be predetermined or not and may depend on operating and atmospheric conditions (e.g., altitude or ambient pressure, flow rate of fuel to the combustor prior to flushing, gas turbine engine power level, etc.). The threshold may be determined to prevent an undesirable engine surge condition. In some embodiments, the regulator 68 may be configured to deliver pressurized gas according to a desired (e.g., constant and/or variable) purging pressure and/or flow delivery schedule as a function of time.

Figure 3:
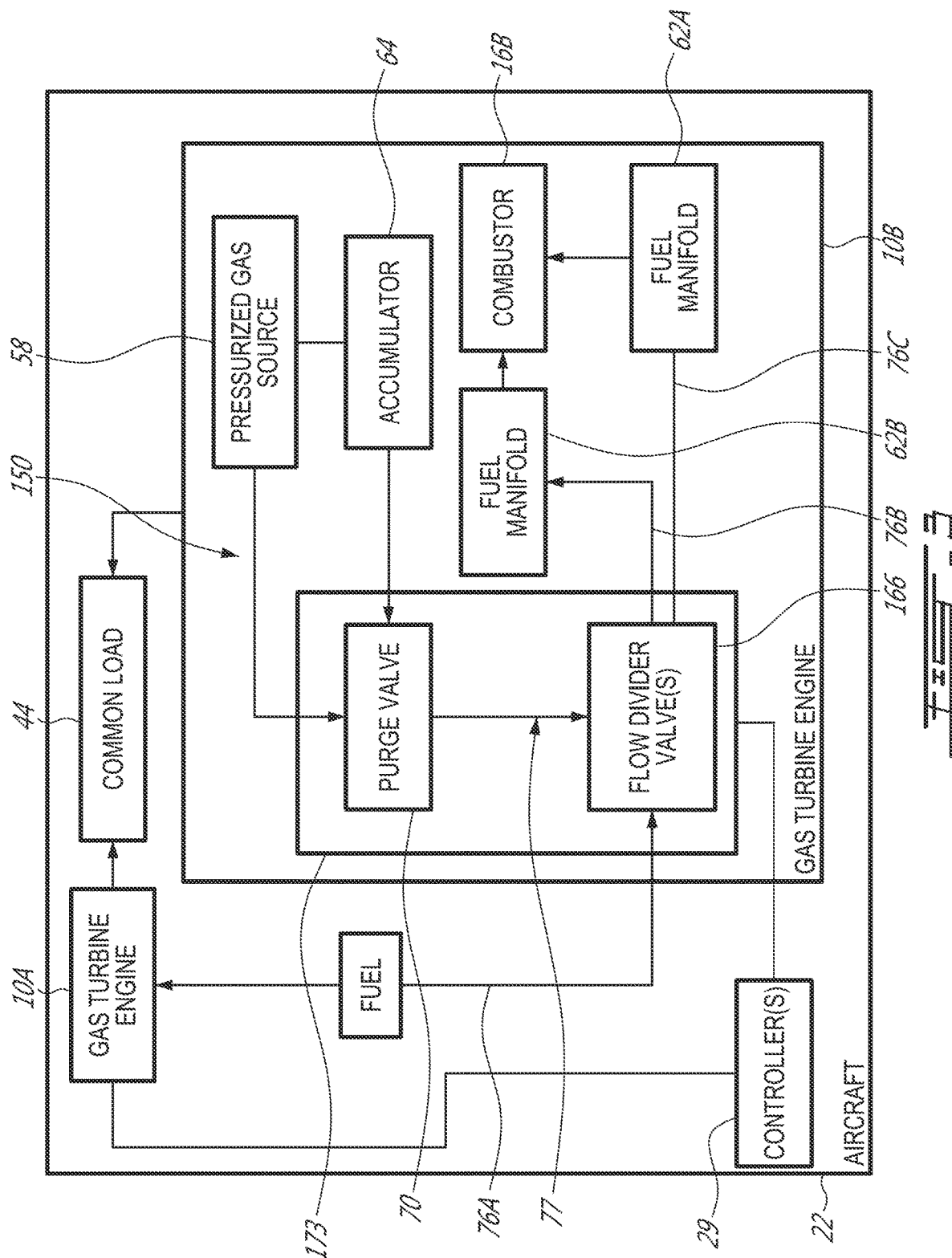
FIG. 3 is a schematic illustration showing another exemplary fuel system of a gas turbine engine.

FIG. 3 is a schematic illustration showing another exemplary fuel system 150 of a GTE 10. Elements of the fuel system 150 that are similar to elements of the fuel system 50 described above are identified using like reference numerals. The GTE 10 may be the SGTE 10B. It is understood that a fuel system of the FGTE 10A may be different or substantially identical to that of the SGTE 10B. The FGTE 10A and the SGTE 10B may be part of the multi-engine power plant 42 configured to drive a common load 44 of the aircraft 22. The fuel nozzles are not shown in FIG. 3.

The fuel system 150 may include an arrangement 173 of valves that may or may not be part of a valve assembly. The arrangement 173 of valves may comprise flow divider valve 166, and a purge (e.g., solenoid, hydraulic, or hydro-mechanical) valve 70 in a flow path between the flow divider valve 166 and the pressurized gas source 58 via the optional accumulator 64. The flow divider valve 166 may be controllable, directly or indirectly, by the controller 29. In a first configuration of the arrangement 173 of valves, the flow divider valve 66 may receive a supply of fuel from a fuel source and may supply fuel to the first and second fuel manifolds 62A, 62B. The first and second fuel manifolds 62A, 62B may be fluidly connected to and configured to supply fuel to a combustor 16B of the SGTE 10B. The purge valve 70 may be closed in the first configuration of the arrangement 173 of valves. The arrangement 173, flow divider valve(s) 166, and/or purge valve 70 may comprise one or more embodiments of (flow divider) valves, or assemblies, described herein, such as embodiments described in FIGS. 16-25C.

In a second configuration of the arrangement 173 of valves, the flow divider valve 166 may continue receiving fuel from the fuel source (possibly at a lower fuel flow rate) but may also additionally receive pressurized gas from the accumulator 64 via the purge valve 70. In some embodiments, receiving pressurized gas from the accumulator 64 via the purge valve 70 may be in addition to, or instead of, receiving pressurized gas from the pressurized gas source 58 via the purge valve 70. The purge valve 70 may be open in the second configuration arrangement 173 of valves. In the second configuration, the flow divider valve 166 may stop supplying fuel to the second fuel manifold 62B while continuing to supply fuel to the first fuel manifold 62A (e.g., at a low fuel flow rate to enable a standby condition of the SGTE 10B), and then may purge (flush) the second fuel manifold 62B of residual fuel by supplying pressurized gas from the pressurized gas source 58 (e.g., via the accumulator 64) to the second fuel manifold 62B to flush fuel therein into the combustor 16B of SGTE 10B.

The accumulator 64 may be charged with air/gas from a pressurized gas source 58 which may be part of or separate from SGTE 10B. The pressurized gas source 58 may be a compressor section 14B or 14A of the SGTE 10B or of the FGTE 10A respectively. In some embodiments, the accumulator 64 may be charged using pressurized air from the compressor section 14A of FGTE 10A. In some embodiments, the accumulator 64 may be charged using pressurized air from the compressor section 14B of SGTE 10B.

Figure 4:
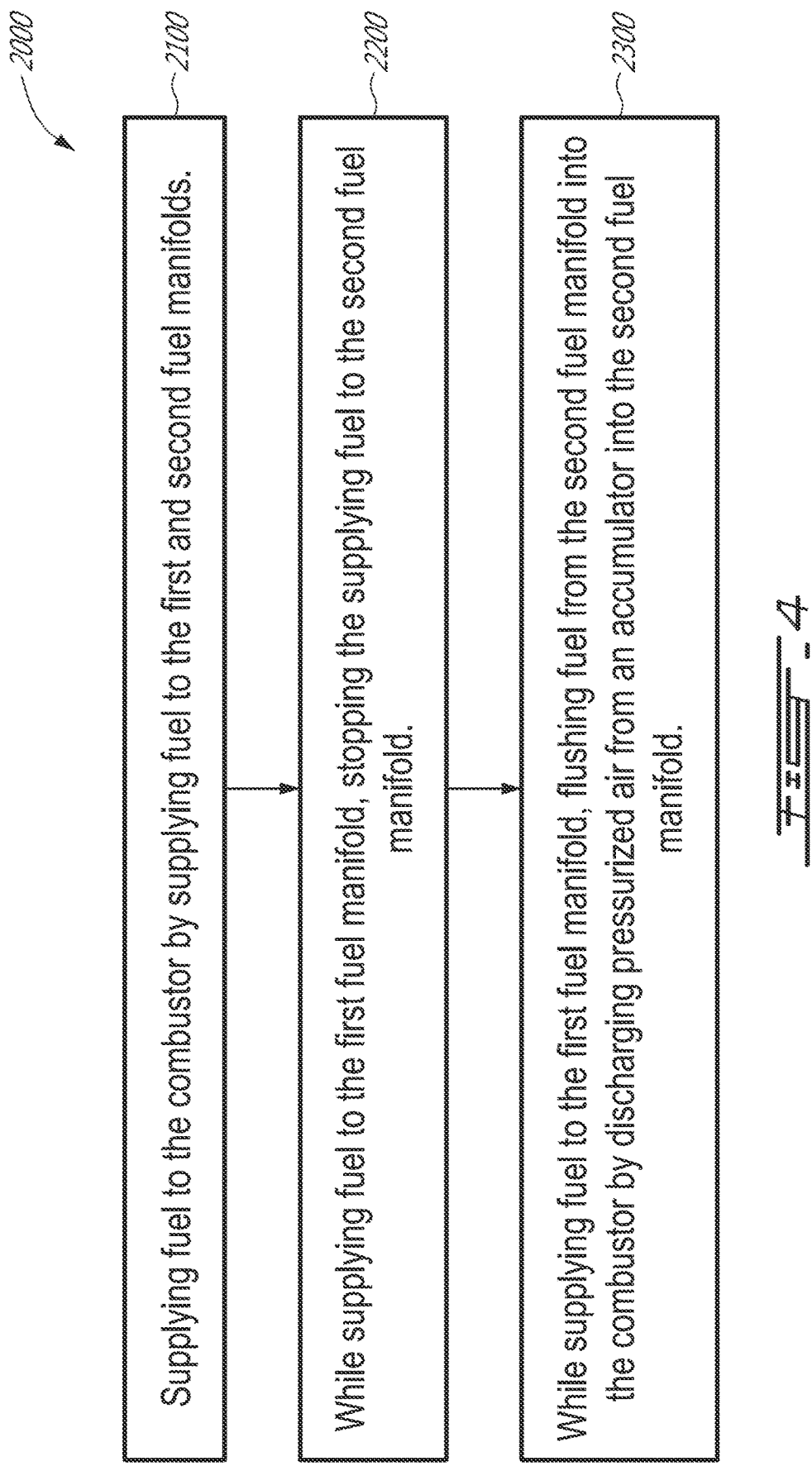
FIG. 4 is a flowchart of an exemplary method of operating a gas turbine engine.

FIG. 4 is a flowchart of an exemplary method 2000 of operating a GTE 10. It is understood that aspects of method 2000 may be combined with other methods, or aspects thereof, described herein. The GTE 10 may have a first fuel manifold 62A and a second fuel manifold 62B configured to supply fuel to the combustor 16 of the GTE 10.

The method 2000 includes supplying fuel to the combustor 16 by supplying fuel to the first and second fuel manifolds 62A, 62B (at block 2100). The method 2000 includes stopping the supplying fuel to the second fuel manifold 62B while supplying fuel to the combustor 16 by supplying fuel to the first fuel manifold 62A (at block 2200), and flushing fuel from the second fuel manifold 62B into the combustor 16 by discharging pressurized air from an accumulator 64 into the second fuel manifold 62B while supplying fuel to the combustor 16 by supplying fuel to the first fuel manifold 62A (at block 2300).

In some embodiments of the method 2000, flushing residual fuel in the second fuel manifold 62B into the combustor 16 includes flushing or purging fuel from fuel nozzles 61B in fluid communication with the second fuel manifold 62B, in order to prevent coking, soot formation, or any other (performance) degradation of fuel nozzles 61B arising due to presence of residual fuel therein when fuel supply to the second fuel manifold 62B is stopped. Method 2000 may be used to transition the GTE 10 from the high-power active mode of operation to the low power standby mode of operation.

Some embodiments of the method 2000 include using flow divider valve 66 or 166 to stop supplying fuel to the second fuel manifold 62B and to supply fuel to the first fuel manifold 62A.

In some embodiments of the method 2000, the GTE 10 is mounted to an aircraft 22 and the method 2000 is executed during flight of the aircraft 22. In an exemplary embodiment, the method 2000 is executed during a sustained cruise operating regime of the aircraft 22, wherein the aircraft 22 is operated at a sustained (steady-state) cruising speed and altitude. In some embodiments, the method 2000 may be executed during other transient phases of flight, e.g., flight take-off, climb, stationary flight (hovering), approach and landing.

In some embodiments of the method 2000, the GTE 10 may be one (e.g., SGTE 10B) of two GTEs 10A, 10B of a helicopter. The method 2000 may include operating the SGTE 10B in a low power mode of operation while fuel is supplied to the first fuel manifold 62A and fuel supply to the second fuel manifold 62B is stopped. The method 2000 may include operating the FGTE 10A in a high-power (e.g., active) mode of operation while the SGTE 10A is operated in the low power (e.g., standby) mode of operation.

Some embodiments of the method 2000 include, after fuel in the second fuel manifold 62B is flushed into the combustor 16 and while continuing supplying fuel to the combustor 16 by supplying fuel to the first fuel manifold 62A, stopping discharging pressurized air from the accumulator 64 into the second fuel manifold 62B. In some embodiments of the method 2000, stopping discharging pressurized air may include letting the accumulator 64 become empty. In some embodiments, stopping discharging may include shutting off the purge valve 70 to close a gas pathway 77.

Some embodiments of the method 2000 include, after stopping discharging pressurized air from the accumulator 64 into the second fuel manifold 62B and while continuing supplying fuel to the combustor 16 by supplying fuel to the first fuel manifold 62B, initiating supplying fuel to the second fuel manifold 62B to resume supplying fuel to the combustor 16. In some of these embodiments of the method 2000, initiating supplying fuel to the second fuel manifold 62B may be a part of a restart or spool-up of the GTE 10. In some of these embodiments of the method 2000, initiating supplying fuel to the second fuel manifold 62B may be changing of the mode of operation of the GTE 10 from the low power (e.g., standby) mode to the high-power active mode.

Some embodiments of the method 2000 include discharging pressurized air from the accumulator 64 into a fuel line 76B (shown in FIG. 2) establishing fluid communication between the flow divider valve 66 and the second fuel manifold 62B. In some of these embodiments of the method 2000, discharging pressurized air may flush and dry the fuel line 76B and the second fuel manifold 62B of residual fuel, and may substantially prevent coking, during operation of the GTE 10, in components of the fuel system 50 exposed or open to the combustor 16.

Some embodiments of the method 2000 include, after fuel in the second fuel manifold 62B is flushed into the combustor 16 and while supplying fuel to the second fuel manifold 62B is stopped, continuing supplying fuel to the combustor 16 by supplying fuel to the first fuel manifold 62A. In some embodiments of the method 2000, the GTE 10 may continue operating with only one fuel manifold 62A being supplied with fuel including during flight (when the GTE 10 is mounted to the aircraft 22), e.g., at a relatively low flow rate consistent with the low power standby mode of operation of the GTE 10.

Some embodiments of the method 2000 include, when fuel is being flushed into the combustor 16, maintaining a fuel flow rate to the combustor 16 via the second fuel manifold 62B below a threshold by controlling a discharge of pressurized air from the accumulator 64 and/or from a pressurized gas source 58, e.g., to avoid a sudden burst of (pressurized) air into the fuel manifold 62B and maintain a fuel flow rate to the combustor 16 via the fuel manifold 62B being purged below a threshold as explained above. In some embodiments, controlling a discharge of pressurized air from the accumulator 64 may be based on a fuel purging schedule including prescribed flow regulation of pressurized gas flowing from the accumulator 64 as a function of time, such as time since stoppage of fuel supply to the second fuel manifold 62B, or other event(s) such as engine power falling below or exceeding a certain level, or an operating condition of the GTE 10. In some embodiments of the method 2000, controlling a discharge of pressurized air from the accumulator 64 and/or from the pressurized gas source 58 may be achieved using the regulator 68.

Some embodiments of the method 2000 include charging the accumulator 64 using pressurized air from a compressor section 14 of the same or another GTE 10 prior to stopping supplying fuel to the second fuel manifold 62B. In some embodiments of the method 2000, the accumulator 64 may be charged using pressurized gas from the compressor section 14 of the same GTE 10 operating in a high-power active mode of operation.

FIG. 5 is a flowchart of an exemplary method 3000 of operating the multi-engine power plant 42 of an aircraft 22. It is understood that aspects of method 3000 may be combined with other methods, or aspects thereof, described herein. The multi-engine power plant 42 includes the FGTE 10A and the SGTE 10B. The FGTE 10A and SGTE 10B are drivingly connected to a common load 44 (shown in FIG. 1). In some embodiments of the method 3000, the FGTE 10A and SGTE 10B are turboshaft engines. In some embodiments of the method 3000, multi-engine power plant 42 may be mounted to aircraft 22 (e.g., helicopter).

The method 3000 includes operating the FGTE 10A and the SGTE 10B to drive the common load 44, operating the SGTE 10B including supplying fuel to a combustor 16B of the SGTE 10B by supplying fuel to a first fuel manifold 62A and a second fuel manifold 62B of the SGTE 10B (block 3100). The method 3000 also includes stopping supplying fuel to the second fuel manifold 62B of the SGTE 10B during the operating the FGTE 10A and the supplying fuel to the combustor 16B of the SGTE 10B by supplying fuel to the first fuel manifold 62A of the SGTE 10B (block 3200), and flushing fuel in the second fuel manifold 62B into the combustor 16B of the SGTE 10B by discharging pressurized air from an accumulator 64 into the second fuel manifold 62B of the SGTE 10B during the operating the FGTE 10A and the supplying fuel to the combustor 16B of the SGTE 10B by the supplying fuel to the first fuel manifold 62A of the SGTE 10B (block 3300).

In some embodiments of the method 3000, operating the FGTE 10A may include operating the FGTE 10A in the high-power active mode of operation.

Some embodiments of the method 3000 may include using a flow divider valve 66 or 166 to stop supplying fuel to the second fuel manifold 62B and to supply fuel to the first fuel manifold 62A.

In some embodiments of the method 3000, the common load 44 may include a rotary wing of the aircraft 22 and the method 3000 may be executed during flight of the aircraft 22.

Some embodiments of the method 3000 may include, after fuel in the second fuel manifold 62B is flushed and while continuing supplying fuel to the combustor 16B of the SGTE 10B by supplying fuel to the first fuel manifold 62A, stopping discharging pressurized air from the accumulator 64 into the second fuel manifold 62B.

Some embodiments of the method 3000 may include, after stopping discharging pressurized air from the accumulator 64 into the second fuel manifold 62B and while continuing supplying fuel to the combustor 16B of the SGTE 10B by supplying fuel to the first fuel manifold 62A, initiating supplying fuel to the second fuel manifold 62B to supply fuel to the combustor 16B of the SGTE 10B.

Some embodiments of the method 3000 may include discharging pressurized air into a fuel line 76B establishing fluid communication between the flow divider valve 66 and the second fuel manifold 62B of the SGTE 10B.

Some embodiments of the method 3000 may include, when fuel is being flushed into the combustor 16B of the SGTE 10B, maintaining a fuel flow rate to the combustor 16B via the second fuel manifold 62B below a threshold by controlling a discharge of pressurized air from the accumulator 64 to prevent the delivery of a fuel spike to the combustor 16B during purging.

In various embodiments described herein, the purging gas from pressurized gas source 58 may be pressurized air from a portion of one or more of the gas turbine engines 10A, 10B or obtained from the atmosphere. However, it is understood that other types of purging gasses such as $CO_2$ or $N_2$ may also be suitable.

FIG. 6 is a schematic illustration of another exemplary fuel system 250 of a GTE 10 of a multi-engine power plant 42 (shown in FIG. 1) of an aircraft 22. Elements of the fuel system 250 that are similar to elements of the fuel system 50 described above are identified using like reference numerals. The GTE 10 may be the SGTE 10B. It is understood that a fuel system of the FGTE 10A may be different or substantially identical to that of SGTE 10B. The FGTE 10A and the SGTE 10B may be part of the multi-engine power plant 42 configured to drive a common load 44 of the aircraft 22.

The fuel system 250 includes one or more flow divider valves 66 disposed in a fuel line 76 (having a portion 76A upstream of the flow divider valve 66 and a portion 76B downstream of the flow divider valve 66) connecting a fuel source to the second fuel manifold 62B. In some embodiments, the first fuel manifold 62A may be configured to receive fuel from the fuel source via the flow divider valve 66 or otherwise. A fuel pump (not shown) may be operatively disposed between the fuel source and the flow divider valve 66.

The fuel system 250 may include a pressurized gas generator 78 disposed at one end of a gas pathway 77. The gas pathway 77 may be connected to the fuel line 76B between the flow divider valve 66 and the second fuel manifold 62B. Alternatively, the gas pathway 77 may be connected to the second fuel manifold 62B via the flow divider valve 66. The pressurized gas generator 78 may be part of or separate from SGTE 10B. In various embodiments, the pressurized gas generator 78 may be a pump including an axial and/or centrifugal compressor, fan or blower for example. The pressurized gas generator 78 may be driven (e.g., electrically, mechanically, pneumatically or hydraulically) by an electric, pneumatic or hydraulic motor. In some embodiments, the pressurized gas generator 78 may be driven directly by an aircraft engine, e.g., the pressurized gas generator 78 may be drivingly coupled to and mechanically driven by a shaft of the FGTE 10A or the SGTE 10B. The pressurized gas generator 78 may be driven (e.g. actuated) or controlled electronically by controller(s) 29 for example.

The fuel system 250 may include one or more valves configurable (e.g., actuatable) between a first configuration and a second configuration. The one or more valves may be configured to supply fuel to the first and second fuel manifolds 62A, 62B in the first configuration. The one or more valves may be configured to supply fuel to the first fuel manifold 62A and stop supplying fuel to the second fuel manifold 62B in the second configuration.

The fuel system 250 may include a one-way valve 72B disposed in the gas pathway 77 between the pressurized gas generator 78 and the fuel line 76. The valve 72B may be configured to prevent fuel from flowing towards the pressurized gas generator 78. A portion 77A of the gas pathway 77 may be connected to the pressurized gas generator 78 upstream of the valve 72B and a portion 77B of the gas pathway 77 may be connected to the fuel line 76B downstream of the flow divider valve 66) and/or via the flow divider valve 66.

The multi-engine power plant 42 may be configured to operate in the asymmetric mode, during which the FGTE 10A is configured to operate in a high-power (active) mode and the SGTE 10B is configured to operate in a low power (standby) mode. During the asymmetric mode of operation, the flow divider valve 66 may be configured to stop supplying fuel to the second fuel manifold 62B while supplying fuel to the first fuel manifold 62A. Furthermore, during the asymmetric mode, the pressurized gas generator 78 may be configured to supply pressurized gas to the second fuel manifold 62B via the fuel line 76 (or 76B) to flush residual fuel in the second fuel manifold 62B into the combustor 16B.

The pressurized gas generator 78 may be driven continuously or may be pulsed until the fuel in a fuel line is purged, including when an aircraft engine is in operation. The fuel system 250 may be able to provide an on-demand supply of air to dry and cool the fuel manifold(s) 62A and/or 62B and associated nozzles feeding combustor 16B.

The flow divider valve(s) 66 and/or valve(s) 72B may comprise one or more embodiments of (flow divider) valves, or assemblies, described herein, such as embodiments described in FIGS. 16-25C.

Figure 7:
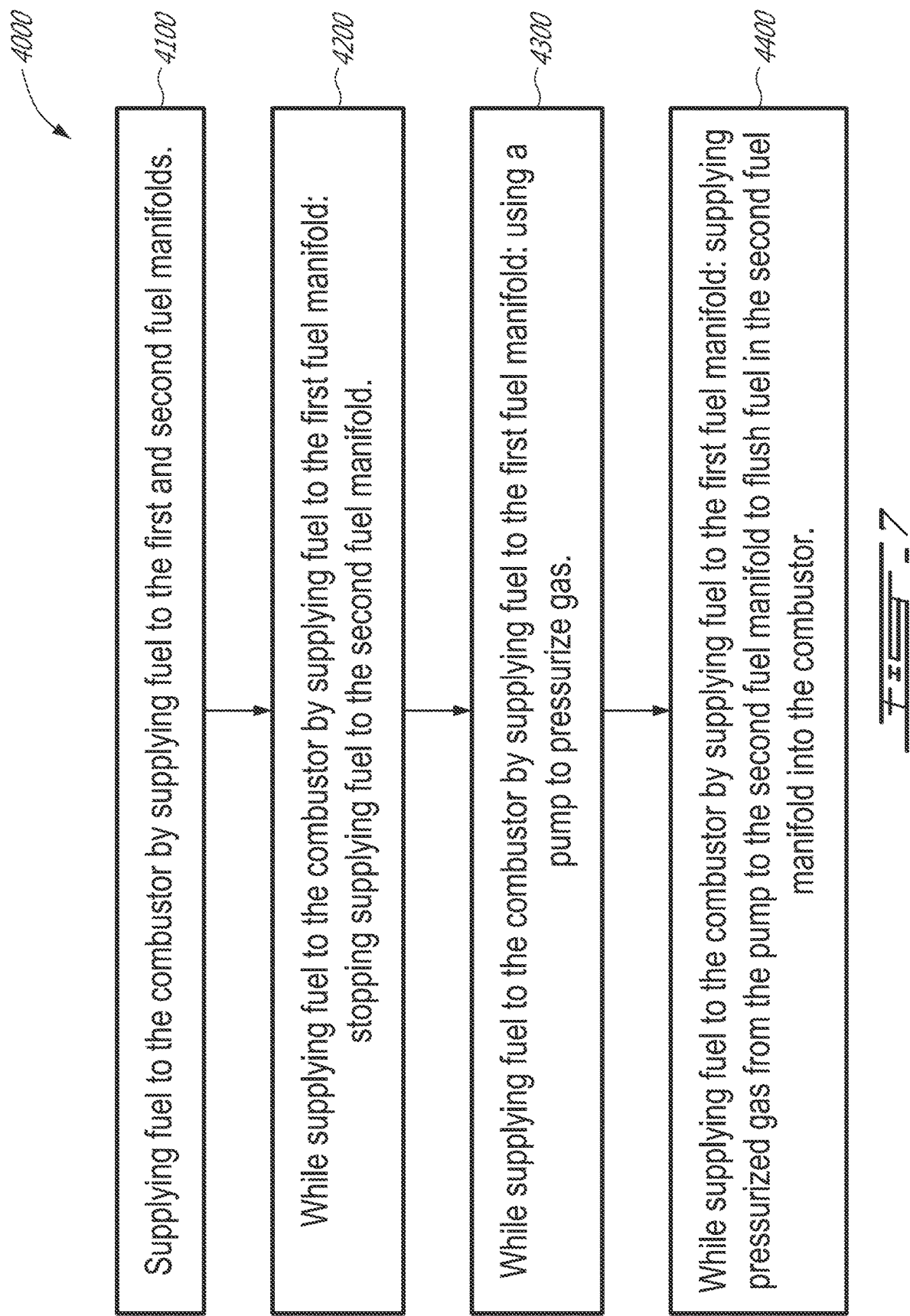
FIG. 7 is a flowchart of another exemplary method of operating a gas turbine engine.

FIG. 7 is a flowchart of a method 4000 of operating a GTE 10. It is understood that aspects of method 4000 may be combined with other methods described herein. The GTE 10 has a first fuel manifold 62A and a second fuel manifold 62B fluidly connected to and configured to supply fuel to a combustor 16 of the GTE 10. The method 4000 includes supplying fuel to the combustor 16 by supplying fuel to the first and second fuel manifolds 62A, 62B (see block 4100). The method 4000 also includes stopping supplying fuel to the second fuel manifold 62B while (e.g., continually) supplying fuel to the combustor 16 by supplying fuel to the first fuel manifold 62A (see block 4200). The method 4000 also includes using a pressurized gas generator 78 (e.g., pump) to pressurize gas while (e.g., continually) supplying fuel to the combustor 16 by supplying fuel to the first fuel manifold 62A (see block 4300). The method 4000 also includes supplying pressurized gas from the pressurized gas generator 78 (e.g., a pump) to the second fuel manifold 62B to flush fuel in the second fuel manifold 62B into the combustor 16 while (e.g., continually) supplying fuel to the combustor 16 by supplying fuel to the first fuel manifold 62A (see block 4400).

Some embodiments of the method 4000 include using a flow divider valve 66 or 166 to stop supplying fuel to the second fuel manifold 62B and to supply fuel to the first fuel manifold 62B.

Some embodiments of the method 4000 include increasing the supply of fuel to the first fuel manifold 62A when stopping supplying fuel to the second fuel manifold 62B.

In some embodiments of the method 4000, the GTE 10 is mounted to an aircraft 22 (e.g., helicopter) and the method 4000 is executed during flight of the aircraft 22. In some of these embodiments, the GTE 10 may correspond to SGTE 10B, and FGTE 10A may also be mounted to the aircraft 22. The method 4000 may include: operating the SGTE 10B in a low power (standby) mode of operation while fuel is supplied to the first fuel manifold 62A and fuel supply to the second fuel manifold 62B is stopped. In some of these embodiments, the method 4000 includes operating the FGTE 10A in a high-power mode of operation while the SGTE 10B is operated in the low power (standby) mode of operation.

Some embodiments of the method 4000 include, after fuel in the second fuel manifold 62B is flushed into the combustor 16 and while continuing supplying fuel to the combustor 16 by supplying fuel to the first fuel manifold 62A, stopping supplying pressurized gas from the pressurized gas generator 78 to the second fuel manifold 62B.

Some embodiments of the method 4000 include, after stopping supplying pressurized gas from the pressurized gas generator 78 to the second fuel manifold 62B and while continuing supplying fuel to the combustor 16 by supplying fuel to the first fuel manifold 62A, initiating supplying fuel to the second fuel manifold 62B to supply fuel to the combustor 16.

Some embodiments of the method 4000 include directing supplying pressurized gas at a location along a fuel line 76B establishing fluid communication between a flow divider valve 66 or 166 and the second fuel manifold 62B.

Some embodiments of the method 4000 include, after fuel in the second fuel manifold 62B is flushed into the combustor 16 and while supplying fuel to the second fuel manifold 62B is stopped, continuing supplying fuel to the combustor 16 by supplying fuel to the first fuel manifold 62A.

Figure 8:
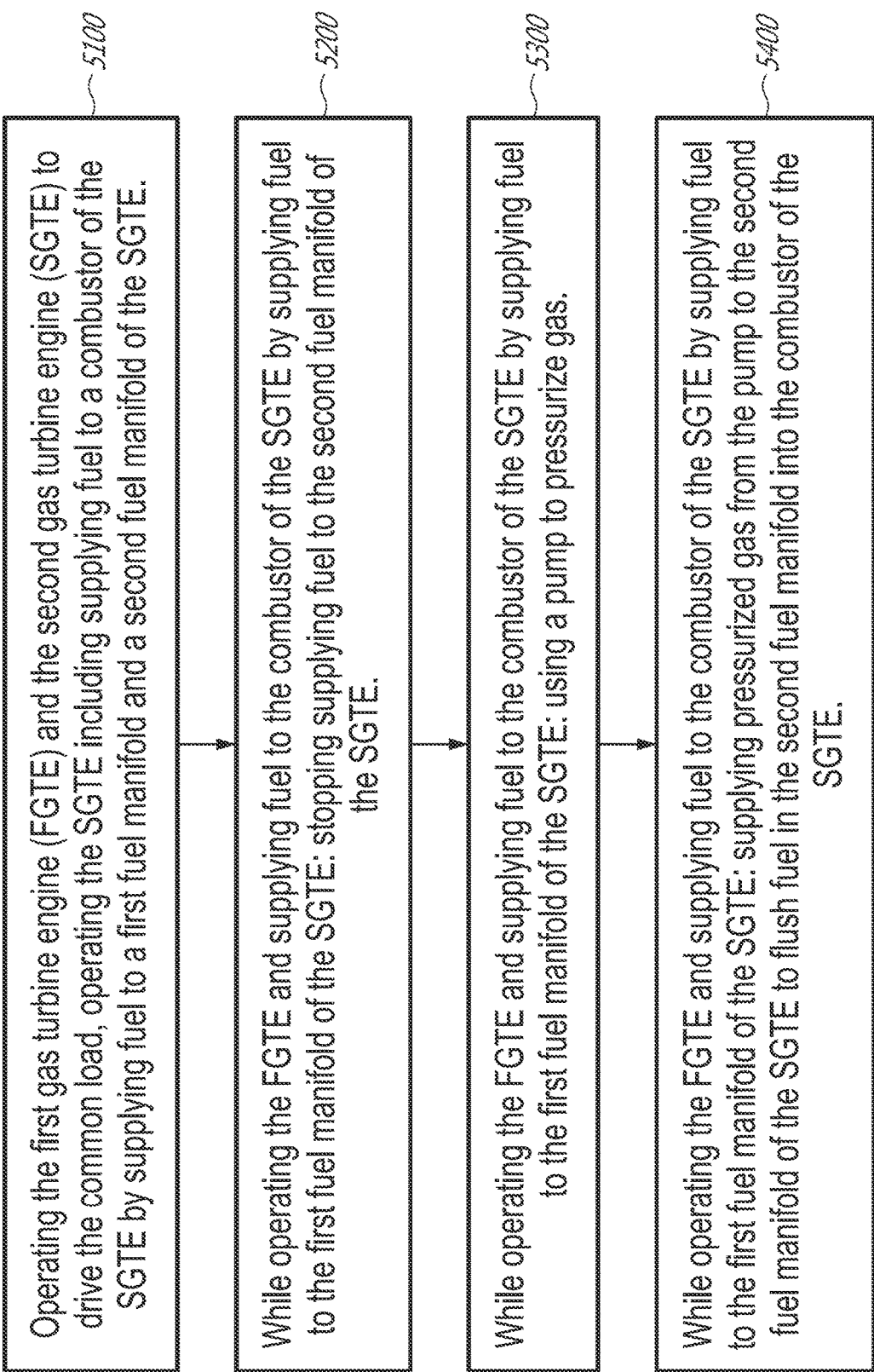
FIG. 8 is a flowchart of another exemplary method of operating a multi-engine power plant.

FIG. 8 is a flowchart of a method 5000 of operating a multi-engine power plant 42, in accordance with an embodiment. It is understood that aspects of method 5000 may be combined with other methods, or aspects thereof, described herein. The multi-engine power plant 42 includes the FGTE 10A and the SGTE 10B drivingly connected to a common load 44.

The method 5000 includes operating the FGTE 10A and the SGTE 10B to drive the common load 44 where operating the SGTE 10B includes supplying fuel to a combustor 16B of the SGTE 10B by supplying fuel to a first fuel manifold 62A and a second fuel manifold 62B of the SGTE 10B (see block 5100).

The method 5000 includes stopping supplying fuel to the second fuel manifold 62B of the SGTE 10B while operating the FGTE 10A and supplying fuel to the combustor 16B of the SGTE 10B by supplying fuel to the first fuel manifold 62A of the SGTE 10B (see block 5200).

The method 5000 includes using a pressurized gas generator 78 (e.g., pump) to pressurize gas while operating the FGTE 10A and supplying fuel to the combustor 16B of the SGTE 10B by supplying fuel to the first fuel manifold 62A of the SGTE 10B (see block 5300).

The method 5000 includes supplying pressurized gas from the pressurized gas generator 78 to the second fuel manifold 62B of the SGTE 10B to flush fuel in the second fuel manifold 62B into the combustor 16B of the SGTE 10B while operating the FGTE 10A and supplying fuel to the combustor 16B of the SGTE 10B by supplying fuel to the first fuel manifold 62A of the SGTE 10B (see block 5400).

Some embodiments of the method 5000 include using a flow divider valve 66 or 166 to stop supplying fuel to the second fuel manifold 62B and to continue to supply fuel to the first fuel manifold 62A.

In some embodiments of the method 5000, the common load 44 includes a rotary wing of the aircraft 22. In some of these embodiments, the method 5000 is executed during flight of the aircraft 22.

Some embodiments of the method 5000 include, after fuel in the second fuel manifold 62B is flushed and while continuing supplying fuel to the combustor 16B of the SGTE 10B by supplying fuel to the first fuel manifold 62A, stopping supplying pressurized gas from the pressurized gas generator 78 to the second fuel manifold 62B.

Some embodiments of the method 5000 include, after stopping supplying pressurized gas from the pressurized gas generator 78 to the second fuel manifold 62B and while continuing supplying fuel to the combustor 16B of the SGTE 10B by supplying fuel to the first fuel manifold 62A, initiating supplying fuel to the second fuel manifold 62B to resume the supply of fuel to the combustor 16B of the SGTE 10B via the second fuel manifold 62B.

Some embodiments of the method 5000 include directing pressurized gas into a fuel line 76B establishing fluid communication between a flow divider valve 66 and the second fuel manifold 62B.

Some embodiments of the method 5000 include, after fuel in the second fuel manifold 62B is flushed and while supplying fuel to the second fuel manifold 62B is stopped, continuing supplying fuel to the combustor 16B of the SGTE 10B by supplying fuel to the first fuel manifold 62A.

Figure 9:
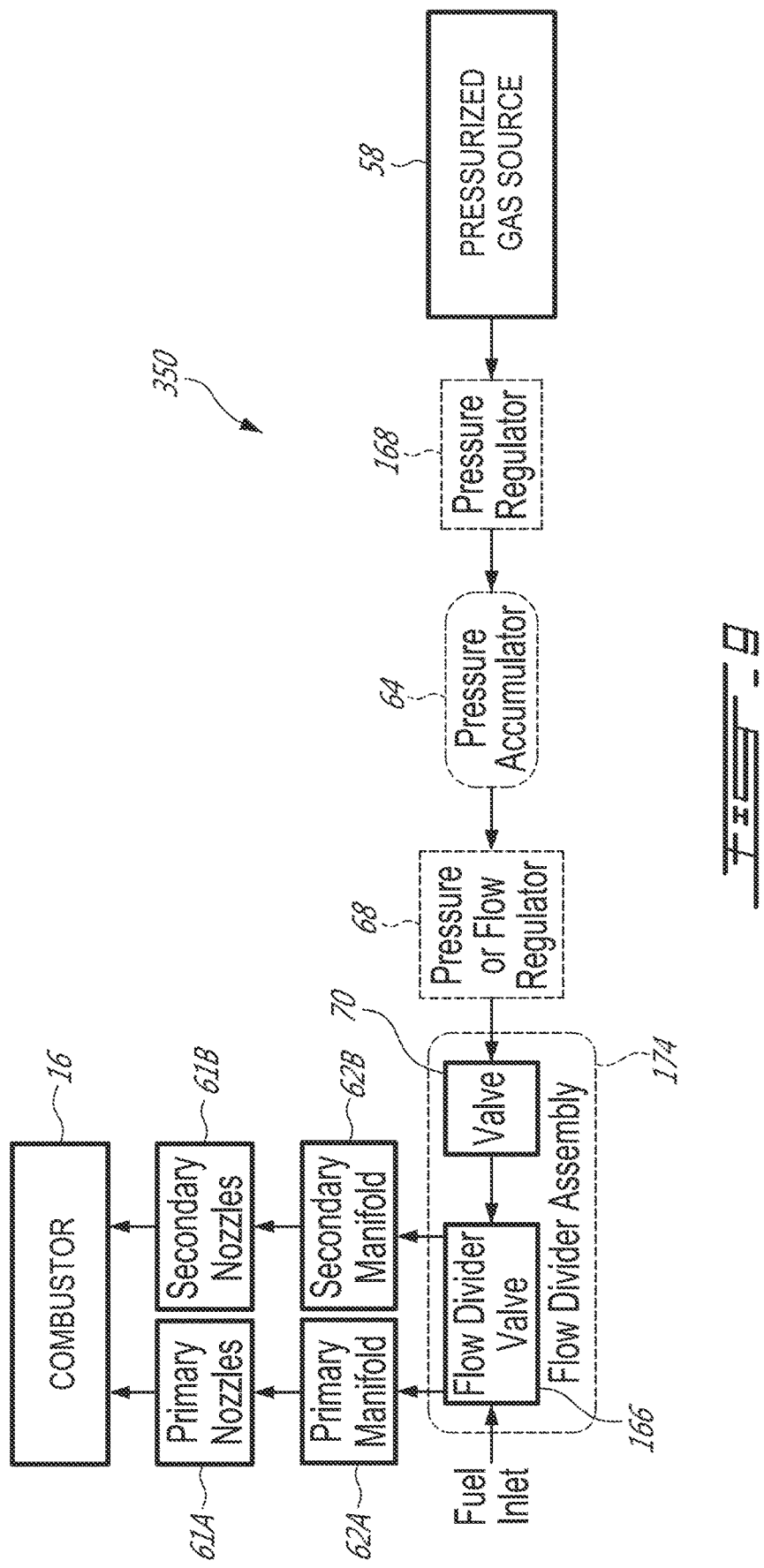
FIG. 9 is a schematic illustration of another exemplary fuel system of a gas turbine engine.

FIG. 9 is a schematic illustration of an exemplary fuel system 350 of a GTE 10. Elements of the fuel system 350 that are similar to elements of fuel systems described above are identified using like reference numerals. The fuel system 350 includes a first (e.g., primary) fuel manifold 62A fluidly connected to and configured to supply fuel to a combustor 16 of the GTE 10 via nozzles 61A, and a second (e.g., secondary) fuel manifold 62B configured to supply fuel to the combustor 16 via nozzles 61B. The fuel system 350 includes a flow divider assembly 174 configurable (e.g., actuatable) between a first configuration and a second configuration. The flow divider assembly 174 includes a flow divider valve 166 and a purge valve 70. The flow divider valve 166 is configured to, in the first configuration, supply fuel to the first fuel manifold 62A and the second fuel manifold 62B and to, in the second configuration, stop supplying fuel to the second fuel manifold 62B while continuing to supply fuel to the first fuel manifold 62A. The purge valve 70 is configured to, in the second configuration of the flow divider assembly 174, permit pressurized gas to flow to the second fuel manifold 62B to flush fuel in the second fuel manifold 62B into the combustor 16. The purge valve 70 may be configured to, in the first configuration, prevent fuel from entering the gas pressure accumulator 64 or the pressurized gas source 58.

In some embodiments, the fuel system 350 includes an optional accumulator 64 configured to, in the second configuration of the flow divider assembly 174, supply pressurized air (or other purging gas) to the second fuel manifold 62B to flush residual fuel in the second fuel manifold 62B into the combustor 16.

In some embodiments, the fuel system 350 includes a (e.g., pressure or flow) regulator 68 configured to, in the second configuration of the flow divider assembly 174, control a supply of pressurized gas to the flow divider valve 166 to maintain a controlled fuel flow rate to the combustor 16 via the second fuel manifold 62B below a threshold when fuel is being flushed into the combustor 16 to prevent the delivery of a fuel spike to the combustor 16 or to limit the magnitude of such fuel spike.

In some embodiments, either or both at engine shutdown and transitioning to low-power operation, the fuel system 350 may enable flow and/or pressure regulation of the purge gas so that fuel purged out of the fuel manifolds 62A or 62B enters the combustor 16 at a controlled flow rate to prevent a sudden acceleration of gas turbine engine 10.

In some embodiments, the fuel system 350 may be engine mounted, partially engine mounted or remotely mounted. The purge valve 70 may be integral to (e.g., in unitary construction with) the flow divider valve 166, or may be integral to (e.g., in unitary construction with) the accumulator 64, or may be separate. In some embodiments, the regulator 68 may be integral to (e.g., in unitary construction with) the flow divider valve 166, or may be integral to (e.g., in unitary construction with) the accumulator 64, or may be separate. In some embodiments, the gas pressure and/or the gas flow regulation or non-regulation may be applied to one or several manifolds 62A, 62B dependently or independently form each other. In some embodiments, the pressure regulator 168 may be integral to (e.g., in unitary construction with) the accumulator 64 or may be separate. In some embodiments, purging the fuel manifold(s) 62A, 62B may be maintained continuously over a long period of time during which an aircraft engine is operated, or may be terminated once the fuel manifold(s) 62A, 62B and associated nozzles 61A, 61B are considered empty of fuel. In some embodiments, different pressure sources may be used to purge the different fuel manifolds 62A, 62B. In some embodiments, the fuel manifolds 62A, 62B may have common, partially common or completely independent fuel purging systems.

In some embodiments, the fuel system 350 includes a pressure regulator 168 to regulate the pressure of pressurized air (or other gas) flowing to the accumulator 64 from the pressurized gas source 58. The pressure regulator 168 may be used to regulate desired charge pressure in the accumulator 64.

The flow divider valve 166 and/or flow divider assembly 174 may comprise one or more embodiments of (flow divider) valves, or assemblies, described herein, such as embodiments described in FIGS. 16-25C.

Figure 10:
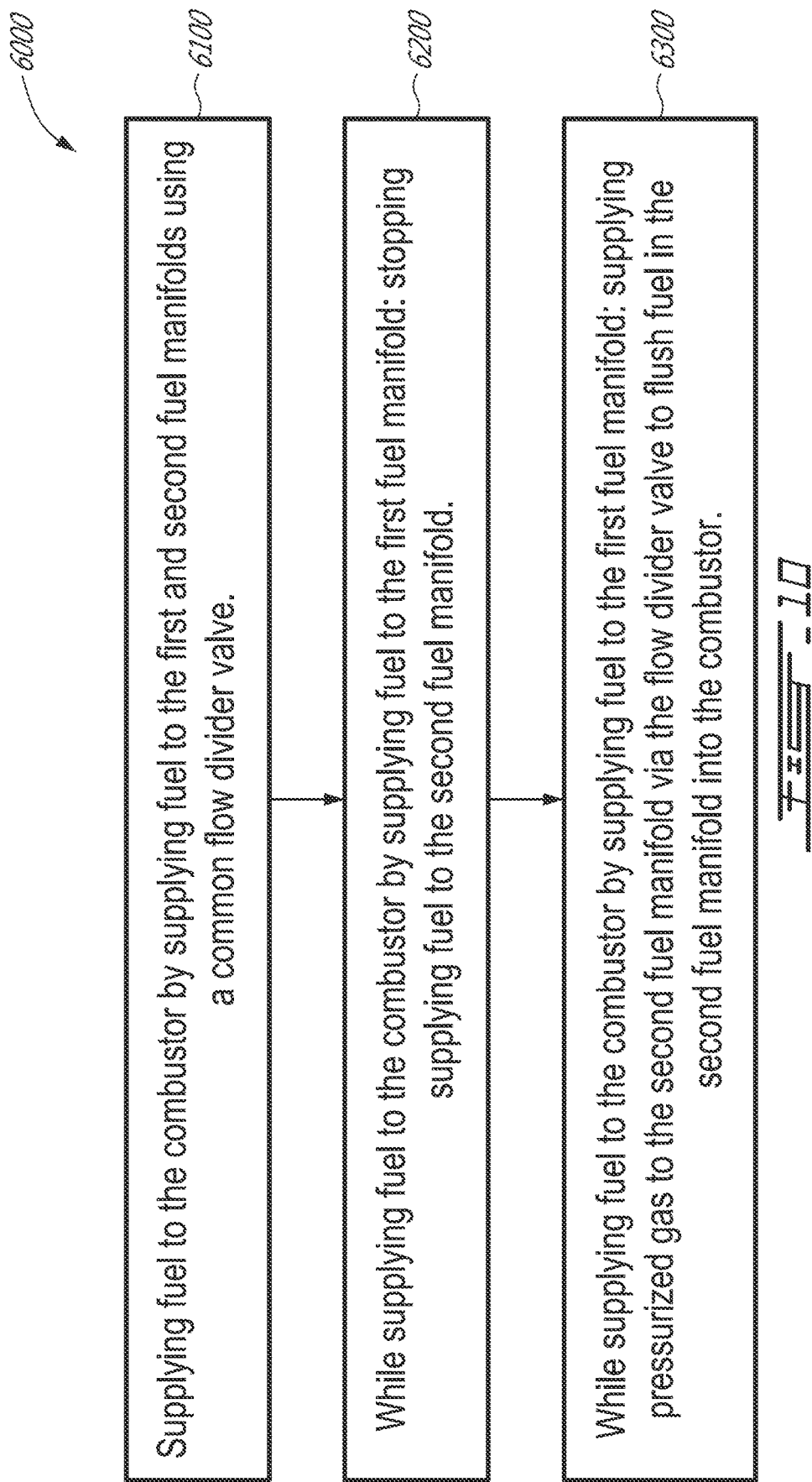
FIG. 10 is a flowchart of another exemplary method of operating a gas turbine engine.

FIG. 10 is a flowchart of another exemplary method 6000 of operating a GTE 10. It is understood that aspects of method 6000 may be combined with other methods, or aspects thereof, described herein. The GTE 10 includes a first fuel manifold 62A and a second fuel manifold 62B fluidly connected to and configured to supply fuel to a combustor 16 of the GTE 10. The method 6000 includes supplying fuel to the combustor 16 by supplying fuel to the first and second fuel manifolds 62A, 62B using a common flow divider valve 166 (block 6100). The method 6000 also includes stopping supplying fuel to the second fuel manifold 62B while supplying fuel to the combustor 16 by supplying fuel to the first fuel manifold 62A (block 6200), and supplying pressurized gas to the second fuel manifold 62B via the flow divider valve 166 to flush fuel in the second fuel manifold 62B into the combustor 16 while supplying fuel to the combustor 16 by supplying fuel to the first fuel manifold 62A (block 6300).

Some embodiments of the method 6000 include discharging pressurized air (or other gas) from the accumulator 64 into the second fuel manifold 62B via the flow divider valve 166 to flush fuel in the second fuel manifold 62B into the combustor 16.

In some embodiments of the method 6000, stopping supplying fuel to the second fuel manifold 62B causes an increase in fuel flow to the first fuel manifold 62A by restricting fuel flow to the second fuel manifold 62B using the flow divider valve 166.

In some embodiments of the method 6000, the GTE 10 is mounted to an aircraft 22. In some of these embodiments, the method 6000 is executed during flight of the aircraft 22.

Some embodiments of the method 6000 include, when fuel is being flushed into the combustor 16, maintaining a fuel flow rate to the combustor 16 via the second fuel manifold 62B below a threshold by controlling a supply of pressurized gas to the second fuel manifold 62B to prevent the delivery of a fuel spike to the combustor 16 during purging or to limit the magnitude of such fuel spike.

Some embodiments of the method 6000 include, after fuel in the second fuel manifold 62B is flushed into the combustor 16 and while supplying fuel to the combustor 16 via the second fuel manifold 62B is stopped, continuing to supply fuel to the combustor 16 via the first fuel manifold 62A using the flow divider valve 166.

Some embodiments of the method 6000 include charging the accumulator 64 using pressurized air from a compressor section 14 of the GTE 10 prior to stopping supplying fuel to the second fuel manifold 62B.

In some embodiments of the method 6000, while supplying fuel to the combustor 16 by supplying fuel to the first fuel manifold 62A via the common flow divider valve 166, stopping supplying fuel to the second fuel manifold 62B may include stopping supplying fuel to the second fuel manifold 62B via the common flow divider valve 166.

Figure 11:
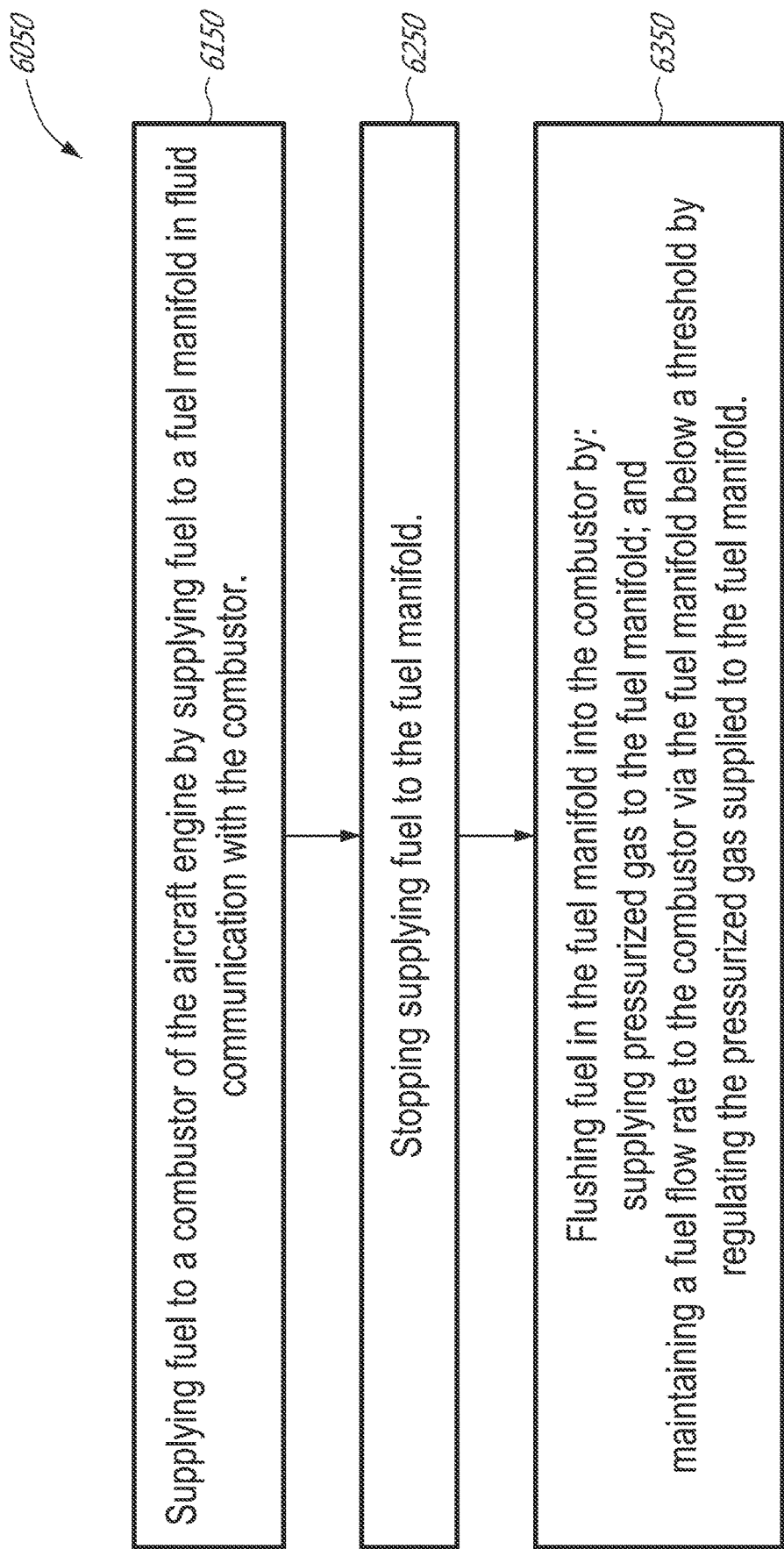
FIG. 11 is a flowchart of another exemplary method of operating a gas turbine engine.

FIG. 11 is a flowchart of another exemplary method 6050 of operating a GTE 10. It is understood that aspects of method 6050 may be combined with other methods, or aspects thereof, described herein. In some embodiments, method 6050 may be an exemplary method to be carried out during low-power (e.g., standby) operation or shutdown of the GTE 10. In some embodiments, the method 6050 may allow the engine to be lit as long as possible during shutdown to burn residual fuel in the combustor 16 and/or one or more of the fuel manifolds 62A, 62B.

The method 6050 includes supplying fuel to the combustor 16 by supplying fuel to one or more of the fuel manifolds 62A, 62B (block 6150), and stopping supplying fuel to the one or more of the fuel manifolds 62A, 62B (block 6250). The method 6050 also includes supplying pressurized gas to the one or more of the fuel manifolds 62A, 62B to flush residual fuel into the one or more of the fuel manifolds 62A, 62B into the combustor 16; and maintaining a fuel flow rate to the combustor 16 via the one or more of the fuel manifolds 62A, 62B below a threshold by regulating the pressurized gas supplied to the one or more of the fuel manifolds 62A, 62B (block 6350).

Method 6050 may be performed for some or all fuel manifolds 62A, 62B of the GTE 10 depending on whether the GTE 10 is transitioning from a high-power operating regime to a low power operating regime, or the GTE 10A (or 10B) is being shut down.

FIG. 12 is a flowchart of another exemplary method 7000 of operating a multi-engine power plant 42 of an aircraft 22. It is understood that aspects of method 7000 may be combined with other methods, or aspects thereof, described herein. The multi-engine power plant 42 includes the FGTE 10A and the SGTE 10B. The FGTE 10A and SGTE 10B are drivingly connected to a common load 44.

The method 7000 includes operating the FGTE 10A and the SGTE 10B to drive the common load 44. Operating the SGTE 10B includes supplying fuel to a combustor 16B of the SGTE 10B by supplying fuel to a first fuel manifold 62A and a second fuel manifold 62B of the SGTE 10B via a common flow divider valve 166 (block 7100). The method 7000 also includes stopping supplying fuel to the second fuel manifold 62B of the SGTE 10B while operating the FGTE 10A and supplying fuel to the combustor 16B of the SGTE 10B by supplying fuel to the first fuel manifold 62A of the SGTE 10B (block 7200). The method 7000 includes supplying pressurized gas to the second fuel manifold 62B of the SGTE 10B via the flow divider valve 166 to flush fuel in the second fuel manifold 62B into the combustor 16B of the SGTE 10B while operating the FGTE 10A and supplying fuel to the combustor 16B of the SGTE 10B by supplying fuel to the first fuel manifold 62A of the SGTE 10B (block 7300).

Some embodiments of the method 7000 include discharging pressurized air (or other gas) from an accumulator 64 into the second fuel manifold 62B to flush fuel in the second fuel manifold 62B into the combustor 16B of the SGTE 10B.

In some embodiments of the method 7000, the common load 44 includes a rotary wing of the aircraft 22 and the method is executed during flight of the aircraft 22.

Some embodiments of the method 7000 include, when fuel is being flushed into the combustor 16B of the SGTE 10B, maintaining a fuel flow rate to the combustor 16B via the second fuel manifold 62B below a threshold by controlling a supply of pressurized gas to the second fuel manifold 62B.

Some embodiments of the method 7000 include, after fuel in the second fuel manifold 62B is flushed into the combustor 16B of the SGTE 10B and while supplying fuel to the combustor 16B via the second fuel manifold 62B is stopped, continuing to supply fuel to the combustor 16B via the first fuel manifold 62A using the flow divider valve 166.

Some embodiments of the method 7000 include charging the accumulator 64 using pressurized air from a compressor section 14 of the multi-engine power plant 42.

Some embodiments of the method 7000 include charging the accumulator 64 using pressurized air from a compressor section 14A, 14B of the multi-engine power plant 42 prior to stopping supplying fuel to the second fuel manifold 62B.

In some embodiments of the method 7000, while operating the FGTE 10A and supplying fuel to the combustor 16 of the SGTE 10B by supplying fuel to the first fuel manifold 62A of the SGTE 10B: stopping supplying fuel to the second fuel manifold 62B of the SGTE 10B includes while supplying fuel to the combustor 16 of the SGTE 10B by supplying fuel to the first fuel manifold 62A of the SGTE 10B via the common flow divider valve 166, stopping supplying fuel to the second fuel manifold 62B of the SGTE 10B via the common flow divider valve 166.

FIG. 13 is a schematic illustration of another exemplary fuel system 450 of a GTE 10. Elements of the fuel system 450 that are similar to elements of fuel systems described above are identified using like reference numerals. The fuel system 450 may include two or more fuel manifolds (e.g., 62A-62D) fluidly connected to and configured to supply fuel to a combustor 16 of the GTE 10. The fuel system 450 may supply each of the fuel manifolds 62A-62D via a respective/separate flow divider valve 166A-166D forming part of a flow divider assembly 274. The fuel system 450 may also supply fuel to the one or more of the fuel manifolds 62A-62D via a common flow divider valve. Flow divider valves 166A-166D may be designed to open or close (i.e. supply fuel or stop supplying fuel to one or more of the fuel manifold 62A-62D). In some embodiments, fuel may be supplied or stopped according to a predetermined schedule (e.g. dependent on inlet fuel flow rate or fuel pressure, or fuel flow rate or fuel pressure in one or more of the fuel manifolds 62A-62D). Flow divider valves 166A-166D may provide a function of flow division. In some embodiments, one or more flow divider valves 166A-166D may each comprise a single valve. In some embodiments, one or more flow divider assemblies may each comprise a plurality of flow divider valves 166A-166D. In some embodiments described herein, the flow divider valves may be spool-type valves. In some embodiments described herein, the flow divider valves may be poppet-type valves.

In particular, the fuel system 450 includes a first fuel manifold 62A and a second fuel manifold 62B configured to supply fuel to the combustor 16. The flow divider assembly 274 is configurable (e.g., actuatable) between a first configuration and a second configuration. The first flow divider valve 166A is configured to, in the first and second configurations, supply fuel to the first fuel manifold 62A. The second flow divider valve 166B is configured to, in the first configuration, supply fuel to the second fuel manifold 62B and to, in the second configuration, stop supplying fuel to the second fuel manifold 62B. The flow divider assembly 274 includes a purge valve 70B configured to, in the second configuration, permit pressurized gas to flow to the second fuel manifold 62B via the second flow divider valve 166B to flush residual fuel in the second fuel manifold 62B into the combustor 16. In some embodiments, the purge valve 70B may be configured to, in the first configuration, prevent fuel from flowing to and/or entering the pressurized gas source 58A. In some embodiments, the flow divider assembly 274 includes an additional purge valve 70A configured to control flow of purging gas to the first fuel manifold 62A.

In some embodiments of the fuel system 450, the purge valve 70B and the first and second flow divider valves 166A, 166B are disposed inside a common housing 82. In some embodiments, the common housing 82 includes the plurality of flow divider valves 166A-166D. The common housing 82 may include one or more fuel inlets 84 (ports) configured to supply fuel to the first and second flow divider valves 166A, 166B, and in some embodiments additional flow divider valves 166C, 166D. The common housing 82 may include one or more pressurized gas inlets 86B configured to supply pressurized gas to the second flow divider valve 166B. In some embodiments, the common housing 82 may include additional pressurized gas inlets 86A and 86C to supply pressurized gas to the flow divider valves 166A, 166C, 166D. In some embodiments, the pressurized gas inlets 86A-86C (ports) may supply pressurized gas to fuel manifold 62A-62D via flow divider valves 166A-166D to flush fuel in the fuel manifold 62A-62D. The common housing 82 may include one or more outlets 88A, 88B (ports) configured to allow fluid communication between the first flow divider valve 166A and the first fuel manifold 62A, and between the second flow divider valve 166B and the second fuel manifold 62B. In some embodiments, the common housing 82 may include one or more additional outlets 88C, 88D configured to allow fluid communication between the flow divider valves 166C, 166D and the respective fuel manifolds 62C, 62D.

The common housing 82 may include any suitable enclosure made from metallic, polymeric and/or composite material, for example, for housing only components of the fuel system 450 or of other fuel system(s) described herein. The common housing 82 may permit the components of the flow divider assembly 274 to be preassembled and installed into (or removed from) the GTE 10 as a unit. In some embodiments, the common housing 82 may include a common support platform onto which components the flow divider assembly 274 may be preassembled and installed into (or removed from) the GTE 10 as a unit. In some embodiments of the fuel system 450, the common housing 82 could be replaced by such common platform. The use of the common housing 82 and/or the common support platform may facilitate the assembly, installation, removal and maintenance of the flow divider assembly 274. Alternatively, in some embodiments, the components of the flow divider assembly 274 could instead be separately installed into the GTE 10 without the use of a common housing 82 or a common support platform.

In various embodiments of the fuel system 450, the first and second fuel manifolds may be any two of the fuel manifolds 62A-62D, and the first and second flow divider valves may be any two of the flow divider valves 166A-166D.

In some embodiments of the fuel system 450, flow divider valves 166A-166D may be in fluid communication with the combustor 16 by way of a parallel arrangement between the fuel inlet(s) 84 and the fuel outlets 88A-88D.

Some embodiments of the fuel system 450 include one or more regulators 68 disposed in the common housing 82 and configured to receive pressurized gas via one or more of the pressurized gas inlets 86A-86C. The regulator(s) 68 may be configured to, in the second configuration of the flow divider assembly 274, control a supply of pressurized gas to the second flow divider valve 166B to maintain a fuel flow rate to the combustor 16 via the second fuel manifold 62B below a threshold, when fuel is being flushed into the combustor 16 to prevent the delivery of a fuel spike to the combustor 16 during purging or to limit the magnitude of such fuel spike.

Some embodiments of the fuel system 450 include a calibrated orifice 80 to restrict pressurized gas flow to one or more of the flow divider valve 166A-166D. The calibrated orifice 80 may be disposed inside the common housing 82 and configured to receive pressurized gas via one or more of the pressurized gas inlets 86A-86C.

Some embodiments of the fuel system 450 include a third fuel manifold 62C configured to supply fuel to the combustor 16 and a third flow divider valve 166C configured to, in the first configuration, supply fuel to the third fuel manifold 62C and to, in the second configuration of the flow divider assembly 274, stop supplying fuel to the third fuel manifold 62C. The purge valve 70B is configured to, in the second configuration of the flow divider assembly 274, permit pressurized gas to flow to the third fuel manifold 62C via the third flow divider valve 166C to flush fuel in the third fuel manifold 62C into the combustor 16. The purge valve 70B, in the second configuration of the flow divider assembly 274, may fluidly connect a pressurized gas source 58 to the third fuel manifold 62C to supply pressurized gas to the third fuel manifold 62C via the third flow divider valve 166C to flush fuel in the third fuel manifold 62C into the combustor 16. The purge valve 70B may simultaneously cause pressurized gas flow to both second and third fuel manifold 62B, 62C via the second and third flow divider valves 166B, 166C respectively.

The pressurized gas inlets 86A-86C may receive pressurized gas from a common or different pressurized gas sources 58A and 58B. In some embodiments, the pressurized gas sources 58A-58B may be compressor sections 14, 14A, 14B of any gas turbine engine 10A, 10B of the multi-engine power plant 42 (shown in FIG. 1), or one or more other sources (e.g., accumulator, reservoir, pump).

In some configurations of the flow divider assembly 274, the pressurized gas sources 58A and 58B may be used for purging some or all of the fuel manifolds 62A-62D of residual fuel via the flow divider valves 166A-166D.

In some embodiments, the fuel system 450 can be used to purge a fuel manifold 62A (or one of 62B-62D) or several fuel manifolds (a subset of two or more fuel manifolds 62A-62D) sequentially or simultaneously by means of purge valve(s) 70A-70C. In various embodiments, there may be a purge valve for each fuel manifold 62A-62D, or two or more fuel manifolds 62A-62D may share a same purge valve. In some embodiments, purge valves 70A-70C may be housed in the common housing 82.

When purging the fuel manifolds 62A-62D and associated fuel nozzles (not shown in FIG. 13), the purging gas pressure and/or flow into the fuel manifold(s) may be regulated, and/or may be limited by a calibrated orifice or other flow restriction. In some embodiments, regulating (pressurized) gas pressure and/or flow-rate delivered to the fuel manifold(s) 62A-62D during purging may prevent undesirable fuel spikes, and provide more even delivery of purged fuel into the combustor 16 over time. Pressure and/or flow regulators may be housed in the common housing 82. In some embodiments, purge valves 70A-70C may function as pressure and/or flow regulators. Orifices or restrictions 80 and/or may be located upstream or downstream of one or more purge valves (e.g. purge valves 70A, 70B), or can be integral to (e.g., unitary construction with) the one or more purge valves.

In some embodiments, the fuel system 450 may allow staged purging of the fuel manifolds 62A-62D to prevent flame out of the combustor 16 during the purge, e.g. including preventing white smoke resulting from an incomplete fuel burn. In various embodiments, common or distinct pressurized gas sources 58A-58B to purge various subsets of fuel manifolds 62A-62D. Timing or staging of the purge of each fuel manifold 62A-62D may allow purging one or more (or all) of the fuel manifolds 62A-62D while keeping a combustor flame on/alive, e.g. such that all the fuel from the fuel manifolds 62A-62D is burnt/combusted completely instead of being vaporized to thereby avoid white smoke.

In various embodiments, a common pressurized gas source 58A or 58B may be used to purge several fuel manifolds 62A-62D via the flow divider assembly 274, simultaneously or sequentially. Alternatively different pressurized gas sources 58A, 58B may be used to purge different fuel manifolds 62A-62D via the flow divider assembly 274, simultaneously or sequentially. In various embodiments, the fuel system 450 may be used to enter a specific (e.g., low-power) mode of operation for the engine, or may be used at shut down.

FIG. 14 is a flowchart of another exemplary method 8000 of operating a GTE 10. It is understood that aspects of method 8000 may be combined with other methods, or aspects thereof, described herein. The GTE 10 includes a first fuel manifold 62A and a second fuel manifold 62B fluidly connected to and configured to supply fuel to a combustor 16 of the GTE 10. The method 8000 includes supplying fuel to the combustor 16 by supplying fuel to the first fuel manifold 62A via the first flow divider valve 166A, and supplying fuel to the second fuel manifold 62B via the second flow divider valve 166B (block 8100). The method also includes stopping supplying fuel to the second fuel manifold 62B while supplying fuel to the combustor 16 by supplying fuel to the first fuel manifold 62A (block 8200), and supplying pressurized gas to the second fuel manifold 62B via the second flow divider valve 166B to flush residual fuel in the second fuel manifold 62B into the combustor 16 while supplying fuel to the combustor 16 by supplying fuel to the first fuel manifold 62A (block 8300).

In some embodiments of the method 8000, the GTE 10 has a third fuel manifold 62C (or 62D). Some of these embodiments include, while supplying fuel to the first and second fuel manifolds 62A, 62B, supplying fuel to the combustor 16 by supplying fuel to the third fuel manifold 62C via a third flow divider valve 166C, and while supplying fuel to the first fuel manifold 62A and to the second fuel manifold 62B, stopping supplying fuel to the third fuel manifold 62C, and supplying pressurized gas to the third fuel manifold 62C via the third flow divider valve 166C to flush residual fuel in the third fuel manifold 62C into the combustor 16. Supplying pressurized gas to the third fuel manifold 62C may include opening a purge valve 70B permitting pressurized gas flow into the third flow divider valve 166C.

Some embodiments of the method 8000 include, after fuel in the third fuel manifold 62C is flushed into the combustor 16 and while supplying fuel to the second and third fuel manifolds 62B, 62C is stopped, continuing to supply fuel to the combustor 16 by supplying fuel to the first fuel manifold 62A via the first flow divider valve 166A. Such a method may be carried out during low power standby mode of operation of the multi-engine power plant 42 of the aircraft 22 during a sustained cruise regime of flight.

In some embodiments of the method 8000, supplying pressurized gas to the second fuel manifold 62B via the second flow divider valve 166B includes opening the purge valve 70B. In some of these embodiments, purging or flushing fuel from second and third fuel manifolds 62B and 62C may be controlled or initiated by the opening of purge valve 70B. In some embodiments of the method 8000, an additional purge valve 70A may be provided to control purging or flushing of residual fuel from the first fuel manifold 62A during shut-down of the GTE 10 for example.

In some embodiments of the method 8000, the GTE 10 is mounted to an aircraft 22. In some of these embodiments, the method 8000 is executed during flight of the aircraft 22.

In some embodiments of the method 8000, the GTE 10 is one of two or more GTEs 10A, 10B mounted to the aircraft 22. In some embodiments, the method 8000 includes: operating the SGTE 10B in a low power mode of operation while fuel is supplied to the first fuel manifold 62A of the SGTE 10B and fuel supply to the second fuel manifold 62B of the SGTE 10B is stopped; and operating the FGTE 10A in a high-power mode of operation while the SGTE 10B is operated in the low power mode of operation.

Some embodiments of the method 8000 include, when fuel is being flushed into the combustor 16, maintaining a fuel flow rate to the combustor 16 via the second fuel manifold 62B below a threshold by controlling a supply of pressurized gas to the second fuel manifold 62B to prevent the delivery of a fuel spike to the combustor 16 during purging or to limit the magnitude of such fuel spike.

Some embodiments of the method 8000 include using a calibrated orifice 80 to restrict pressurized gas flow to the second fuel manifold 62B and/or any fuel manifolds 62A-62D of GTE 10.

Some embodiments of the method 8000 include, after fuel in the second fuel manifold 62B is flushed into the combustor 16 and while supplying fuel to the combustor 16 via the second fuel manifold 62B is stopped, continuing to supply fuel to the combustor 16 by supplying fuel to the first fuel manifold 62A via the first flow divider valve 166A.

FIG. 15 is a flowchart of another exemplary method 9000 of operating a multi-engine power plant 42. It is understood that aspects of method 9000 may be combined with other methods, or aspects thereof, described herein. The multi-engine power plant 42 includes the FGTE 10A and the SGTE 10B, the FGTE 10A and SGTE 10B being drivingly connected to a common load 44.

The method 9000 includes operating the FGTE 10A and the SGTE 10B to drive the common load 44. Operating the SGTE 10B includes: supplying fuel to a combustor 16B of the SGTE 10B by supplying fuel to a first fuel manifold 62A of the SGTE 10B via a first flow divider valve 166A; and supplying fuel to the combustor 16B by supplying fuel to a second fuel manifold 62B of the SGTE 10B via a second flow divider valve 166B (block 9100). The method 9000 also includes stopping supplying fuel to the second fuel manifold 62B of the SGTE 10B while operating the FGTE 10A and supplying fuel to the combustor 16B of the SGTE 10B by supplying fuel to the first fuel manifold 62A of the SGTE 10B (block 9200), and supplying pressurized gas to the second fuel manifold 62B of the SGTE 10B via the second flow divider valve 166B to flush fuel in the second fuel manifold 62B into the combustor 16B of the SGTE 10B while operating the FGTE 10A and supplying fuel to the combustor 16B of the SGTE 10B by supplying fuel to the first fuel manifold 62A of the SGTE 10B (block 9300).

In some embodiments of the method 9000, the common load 44 includes a rotary wing of the aircraft 22. In some of these embodiments, the method 9000 is executed during flight of the aircraft 22.

Some embodiments of the method 9000 include, when fuel is being flushed into the combustor 16B of the SGTE 10B, maintaining a fuel flow rate to the combustor 16B via the second fuel manifold 62B below a threshold by controlling a supply of pressurized gas to the second fuel manifold 62B to prevent the delivery of a fuel spike to the combustor 16B during purging or limit the magnitude of such fuel spike.

Some embodiments of the method 9000 include using a calibrated orifice 80 to restrict pressurized gas flowing to the second fuel manifold 62B. Some embodiments of the method 9000 include using a calibrated orifice 80 to restrict pressurized gas flow to any fuel manifolds 62A-62D of the multi-engine power plant 42. Some embodiments of the method 9000 include using one or more flow and/or pressure regulator(s) to control purging gas delivery to one or more fuel manifolds 62A-62D of the multi-engine power plant 42.

Some embodiments of the method 9000 include, after fuel in the second fuel manifold 62B is flushed into the combustor 16B of the SGTE 10B and while supplying fuel to the second fuel manifold 62B is stopped, continuing supplying fuel to the combustor 16B by supplying fuel to the first fuel manifold 62A.

FIG. 16 is a schematic cross-sectional view of another exemplary fuel system 550 of a GTE 10. Elements of the fuel system 550 that are similar to elements of fuel systems described above are identified using like reference numerals. The fuel system 550 includes fuel manifolds 62A-62C fluidly connected to and configured to supply fuel to a combustor 16 of the GTE 10. The fuel system 550 includes a flow divider assembly 374 configurable (e.g., actuatable) between a first configuration and a second configuration. The flow divider assembly 374 may be configurable (e.g., actuatable) to adopt additional configurations. The flow divider assembly 374 may include a first flow divider valve 366A configured to, in the first and second configurations, supply fuel to the first fuel manifold 62A, a second flow divider valve 366B configured to, in the first configuration, supply fuel to the second fuel manifold 62B and to, in the second configuration, stop supplying fuel to the second fuel manifold 62B.

In some embodiments, the flow divider assembly 374 may include the first flow divider valve 366A which, in the first and second configurations, is fluidly connected to the first fuel manifold 62A and configured to supply fuel to the first fuel manifold 62A. In some embodiments, the flow divider assembly 374 may include the second flow divider valve 366B. In the first configuration of the flow divider assembly 374, the second flow divider valve 366B may be fluidly connected to the second fuel manifold 62B and may be configured to supply fuel to the second fuel manifold 62B and, in the second configuration, may be configured to stop supplying fuel to the second fuel manifold 62B.

Spool 399B of the second flow divider valve 366B may serve as a purge valve configured to, in the second configuration, permit pressurized gas to flow to the second fuel manifold 62B via the second flow divider valve 366B to flush fuel in the second fuel manifold 62B into the combustor 16. The purge valve may, in the second configuration of the flow divider assembly 374, fluidly connect a pressurized gas source to the second fuel manifold 62B to supply pressurized gas to the second fuel manifold 62B via the second flow divider valve 366B to flush fuel in the second fuel manifold 62B into the combustor 16. The flow divider assembly 374 may be housed in a common housing 182 including a (main) fuel inlet 184, one or more pressurized gas inlets 186A-186C, one or more outlets 188A-188O, and one or more flow divider valves 366A-366C disposed inside of the common housing 182. Some embodiments of the fuel system 550 may have fewer or more flow divider valves than illustrated. Seals may be provided in the flow divider valve assembly 374 to prevent leakage.

The flow divider valves 366A-366C may be spool valves configured to be responsive to the fuel pressure at a main fuel inlet 184. Each of the flow divider valves 366A-366C may include an outlet 394A-394C and a fuel inlet 390A-390C. The spools 383A-383C may serve as fuel valves for opening and closing fuel inlets 390A-390C and outlets 394A-394C. The spools 399A-399C may define pressurized gas inlet (purging) valves for opening and closing pressurizing gas inlets 392A-392C. The spools 399A-399C and their associated spools 383A-3830 may respectively be inter-connected by (e.g., coil) springs (shown in circle/oval-dotted lines). The spools 399A-399C and 383A-383C may be responsive to pressure, and may be actuatable solely hydraulically. The spools 399A-399C and their associated spools 392A-392C may be coaxial and actuatable along a common orientation.

The first flow divider valve 366A may be configured to, when the fuel pressure is above a first cracking (i.e., opening) pressure of the first flow divider valve 366A, open the fuel inlet 390A of the first flow divider valve 366A to receive fuel via the main fuel inlet 184 and to, when the fuel pressure is below the first cracking pressure of the first flow divider valve 366A, close the fuel inlet 390A of the first flow divider valve 366A and open a pressurized gas inlet 392A for purging the first fuel manifold 62A.

The second flow divider valve 366B may be configured to, when the fuel pressure is above the first cracking pressure of the first flow divider valve 366A and also above a second cracking pressure of the second flow divider valve 366B, open the fuel inlet 390B of the second flow divider valve 366B to receive fuel via the fuel outlet 394A of the first flow divider valve 366A, and to, when the fuel pressure is below the second cracking pressure of the second flow divider valve 366B, close the fuel inlet 390B of the second flow divider valve 366B and open a pressurized gas inlet 392B for purging the second fuel manifold 62B. The third flow divider valve 366C associated with the third fuel manifold 62C may be configured similarly to the second flow divider valve 366B and the first flow divider valve 366A. In some embodiments, the fuel inlet 390B of the second flow divider valve 366B may be connected to the main fuel inlet 184.

The cracking pressures of the flow divider valves 366A-366C may be predetermined characteristics of the flow divider valves 366A-366C. In some embodiments, the springs provide resistance to movement of the spools 383A-383C and 399A-399C of the respective flow divider valves 366A-366C and may be selected to define the respective cracking pressures. Exemplary relative stiffnesses of the springs are illustrated in FIG. 16 by larger circles/ovals/broken lines representing a higher stiffness and smaller circles/ovals/broken lines representing a lower stiffness. The movement of the spools 399A-399C to release pressurized gas in the respective manifolds 62A-62C may be caused by respective pressures of the pressurized gas at the respective gas inlets 392A-392C. One or more purge valves (not shown in FIG. 16) may be included in the system 550 upstream of the gas inlets 392A-392C.

FIG. 16 shows the spool 383A of the first flow divider valve 366A positioned to permit fuel flow to the first fuel manifold 62A, and the spool 399A positioned to prevent pressurized gas from being delivered to the first fuel manifold 62A and, in some embodiments, to prevent fuel flow toward a pressurized gas source. FIG. 16 shows the spool 383B of the second flow divider valve 366B positioned to prevent fuel flow to the second fuel manifold 62B, and the spool 399B positioned to permit the supply of pressurized gas to the second fuel manifold 62B. FIG. 16 shows the spool 383C of the third flow divider valve 366C positioned to prevent fuel flow to the third fuel manifold 62C, and the spool 399C positioned to permit the supply of pressurized gas to the third fuel manifold 62C.

In reference to FIG. 16, the flow divider valves 366A-366B may be operatively disposed in series with respect to fuel distribution. For example, the fuel from the fuel inlet 184 may flow through the first flow divider valve 366A before reaching the second flow divider valve 366B, and the fuel may flow through the second flow divider valve 366B before reaching the third flow divider valve 366C. Accordingly, a lower fuel delivery pressure at the fuel inlet 184 may cause only flow divider valve 366A to open so that only fuel manifold 62A is supplied with fuel. A medium fuel delivery pressure at the fuel inlet 184 may cause both flow divider valves 366A and 366B to open so that both fuel manifolds 62A and 62B are supplied with fuel. A higher fuel delivery pressure at the fuel inlet 184 may cause all three flow divider valves 366A-366C to open so that all three fuel manifolds 62A-62C are supplied with fuel.

In some embodiments, the flow divider valves 366A-366B may be operatively disposed in parallel with respect to fuel distribution. For example, the fuel from the fuel inlet 184 may flow simultaneously to each of the fuel manifolds 62A-62C via the respective flow divider valves 366A-366C arranged in parallel and having different cracking pressures. Accordingly, a first (e.g., high) fuel delivery pressure at the fuel inlet 184 may cause a first set of the flow divider valves 366A-366C to open and allow the associated one or more of the fuel manifolds (e.g., 62A-62C) to be supplied with fuel. Similarly, a second (e.g., low) fuel delivery pressure at the fuel inlet 184 may cause a second different set of the flow divider valves 366A-366C to open and allow the associated one or more of the fuel manifolds (e.g., only 62A or only 62A and 62B) to be supplied with fuel.

In reference to FIGS. 14 and 16, an embodiment of method 8000 may include supplying fuel to the combustor 16 by supplying fuel to the first fuel manifold 62A via the first flow divider valve 366A, and supplying fuel to the second fuel manifold 62B via the second flow divider valve 366B. While supplying fuel to the combustor 16 by supplying fuel to the first fuel manifold 62A, method 8000 may include stopping supplying fuel to the second fuel manifold 62B, and supplying pressurized gas to the second fuel manifold 62B via the second flow divider valve 366B to flush fuel in the second fuel manifold 62B into the combustor 16.

In some embodiments of the method 8000, the first and second flow divider valves 366A, 366B may be spool-type valves.

In some embodiments of the method 8000, supplying fuel to the combustor 16 by supplying fuel to the first fuel manifold 62A via the first flow divider valve 366A and supplying fuel to the second fuel manifold 62B via the second flow divider valve 366B may include supplying fuel to the fuel inlet 390A of the first flow divider valve 366A via the main fuel inlet 184, using the outlet 394A of the first flow divider valve 366A to supply fuel to the first fuel manifold 62A, supplying fuel to the fuel inlet 390B of the second flow divider valve 366B via the outlet 394A of the first flow divider valve 366A, and using the outlet 394B of the second flow divider valve 366B to supply fuel to the second fuel manifold 62B.

When supplying fuel to the first fuel manifold 62A and to the second fuel manifold 62B via the main fuel inlet 184, the method 8000 may include reducing fuel delivery pressure at the main fuel inlet 184 to between the first cracking pressure of the first flow divider valve 366A and the second cracking pressure of the second flow divider valve 366B to cause the spool 383B to close the fuel inlet 390B of the second flow divider valve 366B and thereby stop supplying fuel to the second fuel manifold 62B. Such closing actuation of the spool 383B may automatically allow the spool 399B of the second flow divider valve 366B to also move (due to the pressure of the pressurized gas and to the spring force) and establish fluid communication between the pressurizing gas inlet 392B and the outlet 394B in order to supply pressurized gas to the second fuel manifold 62B and flush residual fuel in the second fuel manifold 62B into the combustor 16.

In some embodiments, one or more portions of flow divider valves 366A-366C may be in fluid communication with a lower pressure source in order to prevent pressure equalization between two sides of a spool of the valves 366A-366C, e.g. due to lap leakages between the valve spool and bore, and/or to avoid a side of the valve (e.g. the back of the valve and/or the spring chamber of the valve) to build up pressure when the spool is moving (e.g. retracting) and the spring is deforming (e.g. compressing axially). A lower pressure source may be a fuel tank, or a inlet of a fuel control unit, or any location of the fuel system at a lower pressure than the inlet 390A-390C of the flow divider valve 366A-366C.

In some embodiments, the flow divider valve assembly 374 may comprise two or more (e.g., flow divider) valves 366A-366C in a common housing 182 and positively isolated from each other when one or more of the fuel manifolds 62A-62C are shut off and purged empty from fuel by purging gas during engine operation or at engine shut down. The flow divider valves 366A-366C may positively seal the fuel manifolds 62A-62C from one another to stop or mitigate fuel leakages from a fuel manifold containing fuel to another manifold empty of fuel. In various embodiments, the fuel manifolds 62A-62C may be kept sealed from one another by using soft seats, hard seats, dynamic seals, air seals or any other type of seal and/or by using any combination of such or other seals in the flow divider valve assembly 374.

In some embodiments, when one or more of the flow divider valves 366A-366C are connected to a purging pressurized gas source and are in a configuration that enables purging the associated fuel manifolds 62A-62C, the fuel system 550 may be configured to prevent or mitigate (e.g. limit) pressurized purging gas from flowing toward the lower pressure source by means of a check valve, fuse, seal, fixed metering orifice, variable orifice, or any other suitable device. In some situations, purging leaked fuel from a fuel manifold containing fuel to another manifold empty of fuel may be conducted using the purging gas on a continuous basis or intermittently.

In various embodiments, an electrically controlled active system which controls and regulates the pressurized purge gas flow to each of the fuel manifolds 62A-62C may be used instead. Fuel flow from an upstream flow divider (e.g. flow divider valve 366A or 366B) valve to a downstream flow divider valve (e.g. respectively, flow divider valve 366B or 366C) may be shut off by means of a solenoid valve or other electrically controlled active system or a mechanical isolating valve to eliminate or mitigate risk of fuel leakage between fuel manifolds.

FIGS. 17A-17C are schematic cross-sectional views of an embodiment of a flow divider valve 466 (which may be part of a flow divider assembly 474) for a fuel system 50 (or other fuel system) in, respectively, a first configuration (FIG. 17A), a second configuration (FIG. 17B), and a third configuration (FIG. 17C).

FIGS. 18A-18C are schematic cross-sectional views of another embodiment of a flow divider valve 566 (which may be part of a flow divider assembly 574) for a fuel system 50 (or other fuel system) in, respectively, a first configuration (FIG. 18A), a second configuration (FIG. 18B), and a third configuration (FIG. 18C).

FIGS. 19A-19D are schematic cross-sectional views of another embodiment of a flow divider valve 666 (which may be part of a flow divider assembly 674) for a fuel system 50 (or other fuel system) in, respectively, a first configuration (FIG. 19A), a second configuration (FIG. 19B), a third configuration (FIG. 19C), and a fourth configuration (FIG. 19D). Like the first configuration, the fourth configuration of FIG. 19D may cause fuel to be supplied to both fuel manifolds 62A, 62B but fuel flow to the second manifold 62B via passage 699 may be at a reduced flow rate compared to the first configuration of FIG. 19A.

FIGS. 20A-20C are schematic cross-sectional views of another embodiment of a flow divider valve 766 (which may be part of a flow divider assembly 774) for a fuel system 50 (or other fuel system) in, respectively, a first configuration (FIG. 20A), a second configuration (FIG. 20B), and a third configuration (FIG. 20C).

FIGS. 21A-21C are schematic cross-sectional views of another embodiment of a flow divider valve 866 (which may be part of a flow divider assembly 874) for a fuel system 50 (or other fuel system) in, respectively, a first configuration (FIG. 21A), a second configuration (FIG. 21B), and a third configuration (FIG. 21C).

FIGS. 22A-22C are schematic cross-sectional views of another embodiment of a flow divider valve 966 (which may be part of a flow divider assembly 974) for a fuel system 50 (or other fuel system) in, respectively, a first configuration (FIG. 22A), a second configuration (FIG. 22B), and a third configuration (FIG. 22C).

FIGS. 23A-23C are schematic cross-sectional views of another embodiment of a flow divider valve 1066 (which may be part of a flow divider assembly 1074) for a fuel system 50 (or other fuel system) in, respectively, a first configuration (FIG. 23A), a second configuration (FIG. 23B), and a third configuration (FIG. 23C).

FIGS. 24A-24C are schematic cross-sectional views of another embodiment of a flow divider valve 1166 (which may be part of a flow divider assembly 1174) for a fuel system 50 (or other fuel system) in, respectively, a first configuration (FIG. 24A), a second configuration (FIG. 24B), and a third configuration (FIG. 24C).

FIGS. 25A-25C are schematic cross-sectional views of another embodiment of a flow divider valve 1266 (which may be part of a flow divider assembly 1274) for a fuel system 50 (or other fuel system) in, respectively, a first configuration (FIG. 25A), a second configuration (FIG. 25B), and a third configuration (FIG. 25C).

In reference to FIGS. 17A-25C, springs or spring connections (e.g. coil springs) are illustrated as dotted lines or circles, wherein closer spaced (packed) circles represented higher stiffness (and/or compressed) springs and wider spaced (packed) circles represent lower stiffness (and/or expanded) springs. The flow divider valves and assemblies are generally shown in cross-section in a plane parallel to a longitudinal axis (indicated by dashed-dot line and labelled L) of the flow divider valve. In some embodiments, the flow divider valves may be cylindrical with an extension parallel to the longitudinal axis.

Some operating principles and elements of the flow divider valves of FIGS. 17A-25C may be similar. Like elements are identified using reference numerals that are incremented by 100 between sequential figures, whenever possible. In the description, reference to multiple reference numerals is meant to be indicative of the respective embodiments, where and if applicable. Several or all of the flow divider valves may share a common aspect (such as analogous feature(s) or element(s)). In such cases, for conciseness, the common aspect in multiple embodiments may be referred to at once by multiple reference numerals. The multiple reference numerals may be referred to using either singular or plural forms. For brevity, FIGS. 17A-25A may be used to refer to FIGS. 17A, 18A, 19A, 20A, 21A, 22A, 23A, 24A, 25A. Similarly, FIGS. 17B-25B and FIGS. 17C-25C may be used to refer to figures having the same letter.

Fuel may be supplied to the combustor 16 by separate fuel manifolds 62A, 62B by means of a flow divider valve assembly 474, 574, 674, 774, 874, 974, 1074, 1174, 1274 comprising a fuel flow scheduling valve(s) (e.g., flow divider valves 466, 566, 666, 766, 866, 966, 1066, 1166, 1266). In some embodiments, the fuel flow scheduling valves incorporate features to control fuel flow to each one of the fuel manifolds 62A, 62B, to control the flow and/or pressure of pressurized gas (e.g. from a gas driven fuel purge system) flowing to each one of the fuel manifolds 62A, 62B and to control, if necessary, pressure(s) within internal chambers of the flow divider valves 466, 566, 666, 766, 866, 966, 1066, 1166, 1266 or fuel flow scheduling valves that contain reference/control springs or other components.

Each of the flow divider assemblies 474, 574, 674, 774, 874, 974, 1074, 1174, 1274 may be configurable (e.g., actuatable) between a first configuration and a second configuration. Each of the flow divider assemblies 474, 574, 674, 774, 874, 974, 1074, 1174, 1274 may be configurable (e.g., actuatable) to adopt other configurations. The first and second configurations of the flow divider assemblies 474, 574, 674, 774, 874, 974, 1074, 1174, 1274 may correspond to first and second configurations of the respective flow divider valves 466, 566, 666, 766, 866, 966, 1066, 1166, 1266. The flow divider valves 466, 566, 666, 766, 866, 966, 1066, 1166, 1266 are provided with respective fuel inlets 490A, 590, 690, 790, 890, 990, 1090, 1190, 1290; respective pressurized gas inlets 492A, 592, 692, 792, 892, 992, 1092, 1192, 1292A (e.g. for supplying pressurized gas for purging fuel manifolds of fuel when the respective fuel inlets are shut-off); respective first outlets 494A, 594A, 694A, 794A, 894A, 994A, 1094A, 1194A, 1294A configured to provide fluid communication between the respective first chambers 498A, 598A, 698A, 798A, 898A, 998A, 1098A, 1198A and, 1298A and the first fuel manifold 62A; respective second outlets 494B, 594B, 694B, 794B, 894B, 994B, 1094B, 1194B, 1294B configured to provide fluid communication between respective second chambers 498B, 598B, 698B, 798B, 898B, 998B, 1098B, 1198B, 1298B and the second fuel manifold 62B; respective purge valves 495A, 495B, 595A, 595B, 695A, 695B, 795A, 795B, 895A, 895B, 995A, 995B, 1095A, 1095B, 1195A, 1195B, 1295A, 1295B for discharging purging gas into one or more of the fuel manifolds 62A, 62B; and respective valves (or valve members) 496B, 596B, 696B, 796B, 896B, 996B, 1096B, 1196B, 1296B for at least partially sealing and/or closing the respective first chambers 498A, 598A, 698A, 798A, 898A, 998A, 1098A, 1198A, 1298A from the respective second chambers 498B, 598B, 698B, 798B, 898B, 998B, 1098B, 1198B, 1298B in the second configuration. In some embodiments, the flow divider valve 466, 566, 666, 766, 866, 966, 1066, 1166, 1266 may be a spool-type valve.

In the first configuration (FIGS. 17A-25A), the fuel pressure or flow rate at the fuel inlet 490A, 590, 690, 790, 890, 990, 1090, 1190, 1290 is above a second cracking pressure or flow rate. In the second configuration (FIGS. 17B-25B), the fuel pressure or flow rate at the fuel inlet 490A, 590, 690, 790, 890, 990, 1090, 1190, 1290 is between a first cracking pressure or flow rate and a second cracking pressure or flow rate. In the third configuration (FIGS. 17C-25C), the fuel pressure or flow rate at the fuel inlet 490A, 590, 690, 790, 890, 990, 1090, 1190, 1290 is less than the second cracking pressure or flow rate.

In reference to the flow divider valves of FIGS. 17A-25C, seals may be provided to prevent leakage across valves, spools or other flow control components. Seals may include gaskets, deformable/resilient sealing members, pressure seals, o-rings, or suitable plugs. The seals may prevent leakage across sealed chambers under expected operating pressures of the flow divider valves.

The flow divider assembly 474, 574, 674, 774, 874, 974, 1074, 1174, 1274 may include a common housing. The one or more purge valve(s) 495B, 595B, 695B, 795B, 895B, 995B, 1095B, 1195B, 1295B (or purge valve members) may be configurable to (e.g. in the second configuration) permit pressurized gas to flow to the second fuel manifold 62B to flush fuel in the second fuel manifold 62B into the combustor 16. In various embodiments, the purge valve 495B, 595B, 695B, 795B, 895B, 995B, 1095B, 1195B, 1295B may be separate or integrated with the flow divider valve 466, 566, 666, 766, 866, 966, 1066, 1166, 1266. The flow divider assembly 474, 574, 674, 774, 874, 974, 1074, 1174, 1274 may be configured to, in the first configuration, supply fuel to the first fuel manifold 62A and the second fuel manifold 62B and to, in the second configuration, stop supplying fuel to the second fuel manifold 62B while supplying fuel to the first fuel manifold 62A.

Valve (or valve member) 496B, 596B, 696B, 796B, 896B, 996B, 1096B, 1196B, 1296B may be responsive to fuel pressure at the fuel inlet 490A, 590, 690, 790, 890, 990, 1090, 1190, 1290, or a differential pressure between fuel and pressurized gas pressures to, in the second configuration, stop fuel flow between the first chamber 498A, 598A, 698A, 798A, 898A, 998A, 1098A, 1198A, 1298A and the second chamber 498B, 598B, 698B, 798B, 898B, 998B, 1098B, 1198B, 1298B. A plurality of spools may together form the valves. The spools may be inter-connected via suitable connections (e.g., springs). Seals, generally seen in profile as circles on valve member faces or as squares between valve members and walls in FIGS. 17A-25C, may be provided in the flow divider valve 466, 566, 666, 766, 866, 966, 1066, 1166, 1266 to prevent leakage.

The purge valve 495A, 595A, 695A, 795A, 895A, 995A, 1095A, 1195A, 1295A may be responsive to pressure in the second chamber 498B, 598B, 698B, 798B, 898B, 998B, 1098B, 1198B, 1298B to, e.g., in the second configuration, open a purging flow path from the pressurized gas inlet 492A, 592, 692, 792, 892, 992, 1092, 1192, 1292A to the second fuel manifold 62B via the second chamber 498B, 598B, 698B, 798B, 898B, 998B, 1098B, 1198B, 1298B.

In reference to FIGS. 17A-25A, the flow divider assembly 474, 574, 674, 774, 874, 974, 1074, 1174, 1274 is in a first configuration where the first fuel manifold 62A and the second fuel manifold 62B both receive fuel via the flow divider valves. A first fuel path, partially indicated with curved arrows with star markers, between the fuel inlet 490A, 590, 690, 790, 890, 990, 1090, 1190, 1290 and the first outlet 494A, 594A, 694A, 794A, 894A, 994A, 1094A, 1194A, 1294A is open to allow fuel to flow into the first fuel manifold 62A. Additionally, a second fuel path, indicated with curved arrows with star markers followed by the curved arrow with triangle markers, between the fuel inlet 490A, 590, 690, 790, 890, 990, 1090, 1190, 1290 and the second outlet 494B, 594B, 694B, 794B, 894B, 994B, 1094B, 1194B, 1294B is open to allow fuel to flow also into the second fuel manifold 62B.

In the first configuration, fuel pressure at the fuel inlet 490A, 590, 690, 790, 890, 990, 1090, 1190, 1290 may be above the second (and first) cracking pressure or flow rate such that the flow divider valve 466, 566, 666, 766, 866, 966, 1066, 1166, 1266 may facilitate actuation of spools (or valves) to open the first and second fuel paths while closing the purge valve 495B, 595B, 695B, 795B, 895B, 995B, 1095B, 1195B, 1295B. The actuation may be a self-actuation via springs (shown as dotted lines) or other pressure-sensitive or flow-sensitive actuation.

In reference to FIGS. 17B-25B, the flow divider assembly 474, 574, 674, 774, 874, 974, 1074, 1174, 1274 is in a second configuration where the first fuel manifold 62A may continue to receive fuel while fuel flow to the second fuel manifold 62B may be stopped and replaced with a flow of purging gas. In the second configuration, the first chamber 498A, 598A, 698A, 798A, 898A, 998A, 1098A, 1198A, 1298A may be sealed from the second chamber 498B, 598B, 698B, 798B, 898B, 998B, 1098B, 1198B, 1298B. The first fuel path, indicated with curved arrows with star markers, between the fuel inlet 490A, 590, 690, 790, 890, 990, 1090, 1190, 1290 and the first outlet 494A, 594A, 694A, 794A, 894A, 994A, 1094A, 1194A, 1294A may be open with fuel flowing into the first outlet 494A, 594A, 694A, 794A, 894A, 994A, 1094A, 1194A, 1294A. The second fuel path between the fuel inlet 490A, 590, 690, 790, 890, 990, 1090, 1190, 1290 and the second outlet 494B, 594B, 694B, 794B, 894B, 994B, 1094B, 1194B, 1294B may be closed with substantially no fuel flowing from the fuel inlet 490A, 590, 690, 790, 890, 990, 1090, 1190, 1290 into the second outlet 494B, 594B, 694B, 794B, 894B, 994B, 1094B, 1194B, 1294B. A purging flow path, partially indicated with curved arrows with diamond markers, may be opened between the pressurized gas inlet 492A, 592, 692, 792, 892, 992, 1092, 1192, 1292A and the second outlet 494B, 594B, 694B, 794B, 894B, 994B, 1094B, 1194B, 1294B to cause purging gas to flow to the second fuel manifold 62B and purge/flush fuel therein into the combustor 16.

In the second configuration, the fuel pressure or flow rate at the fuel inlet 490A, 590, 690, 790, 890, 990, 1090, 1190, 1290 may be below the second cracking pressure or flow rate but above the first cracking pressure or flow rate such that the flow divider valve 466, 566, 666, 766, 866, 966, 1066, 1166, 1266 may facilitate actuation of spools (valves) to open the first fuel path to the first outlet 494A, 594A, 694A, 794A, 894A, 994A, 1094A, 1194A, 1294A while closing the second fuel path to the second outlet 494B, 594B, 694B, 794B, 894B, 994B, 1094B, 1194B, 1294B. The second fuel path may be closed or sealed (at least partially) via movement of the valve 496B, 596B, 696B, 796B, 896B, 996B, 1096B, 1196B, 1296B towards the first chamber 498A, 598A, 698A, 798A, 898A, 998A, 1098A, 1198A, 1298A (towards the left) to (sealingly) engage with an opposing wall of the flow divider valve 466, 566, 666, 766, 866, 966, 1066, 1166, 1266, and in some embodiments via the movement of the valve 495A, 595A, 695A, 795A, 895A, 995A, 1095A, 1195A, 1295A towards the valve 496B, 596B, 696B, 796B, 896B, 996B, 1096B, 1196B, 1296B or reciprocally or mutually, which closes/stops fluid communication between first and second chambers 498A, 498B, 598A, 598B, 698A, 698B, 798A, 798B, 898A, 898B, 998A, 998B, 1098A, 1098B, 1198A, 1198B, 1298A, 1298B.

The purging flow path may be opened via movement of the purge valve 495B, 595B, 695B, 795B, 895B, 995B, 1095B, 1195B, 1295B to open the pressurized gas inlet 492A, 592, 692, 792, 892, 992, 1092, 1192, 1292A. The movement may be actuated (via spring force) due to a lower pressure in the second chamber 498B, 598B, 698B, 798B, 898B, 998B, 1098B, 1198B, 1298B after sealing from the first chamber 498A, 598A, 698A, 798A, 898A, 998A, 1098A, 1198A, 1298A.

In reference to FIGS. 17C-25C, the flow divider assembly 474, 574, 674, 774, 874, 974, 1074, 1174, 1274 is in a third configuration where fuel supply to both the first fuel manifold 62A and the second fuel manifold 62B may be stopped and replaced with a supply of purging gas. The third configuration may be useful during shut down of GTE 10.

In the third configuration, the first chamber 498A, 598A, 698A, 798A, 898A, 998A, 1098A, 1198A, 1298A and the second chamber 498B, 598B, 698B, 798B, 898B, 998B, 1098B, 1198B, 1298B may be in fluid communication. The fuel inlet 490A, 590, 690, 790, 890, 990, 1090, 1190, 1290 may be closed by actuation of the (e.g. spool) valve. The purging flow path, indicated with curved arrows with diamond markers, is open between the pressurized gas inlet 492A, 592, 692, 792, 892, 992, 1092, 1192, 1292A and the second outlet 494B, 594B, 694B, 794B, 894B, 994B, 1094B, 1194B, 1294B to cause purging gas to flow to the second fuel manifold 62B and purge/flush fuel therein into the combustor 16. An additional purging flow path, indicated with curved arrows with circle markers, is open between the pressurized gas inlet 492A, 592, 692, 792, 892, 992, 1092, 1192, 1292A and the first outlet 494A, 594A, 694A, 794A, 894A, 994A, 1094A, 1194A, 1294A to cause purging gas to flow to the first fuel manifold 62A and purge/flush fuel therein into the combustor 16. In some embodiments, the third configuration of the flow divider valve 466, 566, 666, 766, 866, 966, 1066, 1166, 1266 may be used during shutdown of the GTE 10.

In the third configuration, fuel pressure or flow rate at the fuel inlet 490A, 590, 690, 790, 890, 990, 1090, 1190, 1290 may be below the first (and second) cracking pressure or flow rate such that the flow divider valve 466, 566, 666, 766, 866, 966, 1066, 1166, 1266 facilitates actuation of the (e.g. spool) valves to close the first and second fuel paths while opening pressurized gas inlet 492A, 592, 692, 792, 892, 992, 1092, 1192, 1292A and allowing fluid communication between the first and second chambers 498A, 498B, 598A, 598B, 698A, 698B, 798A, 798B, 898A, 898B, 998A, 998B, 1098A, 1098B, 1198A, 1198B, 1298A, 1298B. The actuation may be a self-actuation, e.g. via springs adapted to respond to the cracking pressure or flow rate by deforming to generate suitable valve displacement(s) that open, closes or modifies flow paths based on the fuel pressure or flow rate.

In reference to FIGS. 17A-17C, the purge valve 495A, 495B and the valves 496A, 496B are selectively actuatable via differential pressure sensing devices 493A, 493B, respectively comprising pistons 491A, 491B with sensing ports in the form of inlets 492B, 492C, 490B. Respective faces of the pistons 491A, 491B may be exposed to lower pressure via respective inlets 492C, 490B. Another face of the piston 491B may be exposed to the pressurized gas.

Similarly, in reference to FIGS. 25A-25C, the valves 1295A, 1296A may be selectively actuatable via differential pressure sensing device 1293, comprising a piston 1291 exposed to a sensing port in the form of inlet 1292B, which may be exposed to a lower pressure source such as an aircraft fuel tank, or a Fuel Control Unit (FCU) inlet or a location at a lower pressure than the respective fuel inlet 492B, 492C, 490B, 1290.

In reference to FIGS. 17A-17C, 22A-22C, 23A-23C and 24A-24C, respective purge holes 497, 997, 1097, 1197A, 1197B selectively openable via the respective purge valves 495A, 995A, 1095A, 1195A may facilitate flow communication between the first and second chambers 498A and 498B, 998A and 998B, 1098A and 1098B, and 1198A and 1198B respectively. The purge valve 1095A may comprise adjacent, cooperating walls configurable to block the purge hole 1097.

In reference to FIGS. 23A-23C and 24A-24C, springs may be at least partially enclosed in respective spring chambers 1089, 1189A, 1189B that may be exposed to lower pressure relative to the fuel pressure. The spring chambers 1189A, 1189B may be fluidly separated/sealed.

In reference to FIGS. 17A-25C, various embodiments and/or aspects of flow divider valves 466, 566, 666, 766, 866, 966, 1066, 1166, 1266 described herein may be used or be implemented in relation to one or more of methods 2000, 3000, 4000, 5000, 6000, 6050, 7000, 8000, and/or 9000 described herein.

For instance, in reference to FIGS. 11 and 17A-25C, some aspects and/or embodiments of the method 6000 may include using only one flow divider valve 466, 566, 666, 766, 866, 966, 1066, 1166, 1266 for: supplying fuel to the combustor 16 by supplying fuel to the first and second fuel manifolds 62A, 62B; and while supplying fuel to the combustor 16 by supplying fuel to the first fuel manifold 62A: stopping supplying fuel to the second fuel manifold 62B, and supplying pressurized gas to the second fuel manifold 62B to flush fuel in the second fuel manifold 62B into the combustor 16.

For example, in some embodiments of the method 6000, the flow divider valve 466, 566, 666, 766, 866, 966, 1066, 1166, 1266 may be a spool-type valve including a plurality of spools. In some embodiments, the flow divider valve 466, 566, 666, 766, 866, 966, 1066, 1166, 1266 may comprise at least two spools where each of the two spools are configured to be responsive to fuel pressure at one or more fuel inlet(s) 490A, 590, 690, 790, 890, 990, 1090, 1190, 1290 of the flow divider valve 466, 566, 666, 766, 866, 966, 1066, 1166, 1266 and pressure at one or more pressurized gas inlet(s) 492A, 592, 692, 792, 892, 992, 1092, 1192, 1292A. Some embodiments of the method 6000 may include, while supplying fuel to the flow divider valve 466, 566, 666, 766, 866, 966, 1066, 1166, 1266 via the fuel inlet 490A, 590, 690, 790, 890, 990, 1090, 1190, 1290: using a first outlet 494A, 594A, 694A, 794A, 894A, 994A, 1094A, 1194A, 1294A of the flow divider valve 466, 566, 666, 766, 866, 966, 1066, 1166, 1266 to supply fuel to the first fuel manifold 62A; and using a second outlet 494B, 594B, 694B, 794B, 894B, 994B, 1094B, 1194B, 1294B of the flow divider valve 466, 566, 666, 766, 866, 966, 1066, 1166, 1266 to supply fuel to the second fuel manifold 62B.

Some embodiments of the method 6000 may include, while keeping a first fuel flow path between the fuel inlet 490A, 590, 690, 790, 890, 990, 1090, 1190, 1290 and the first outlet 494A, 594A, 694A, 794A, 894A, 994A, 1094A, 1194A, 1294A of the flow divider valve 466, 566, 666, 766, 866, 966, 1066, 1166, 1266 open to continue to supply fuel to the first fuel manifold 62A: reducing fuel pressure at the fuel inlet 490A, 590, 690, 790, 890, 990, 1090, 1190, 1290 to cause the flow divider valve 466, 566, 666, 766, 866, 966, 1066, 1166, 1266 to close a second fuel flow path between the fuel inlet 490A, 590, 690, 790, 890, 990, 1090, 1190, 1290 and the second outlet 494B, 594B, 694B, 794B, 894B, 994B, 1094B, 1194B, 1294B, and opening a gas flow path via the second outlet 494B, 594B, 694B, 794B, 894B, 994B, 1094B, 1194B, 1294B of the flow divider valve 466, 566, 666, 766, 866, 966, 1066, 1166, 1266 between the second fuel manifold 62B and the pressurized gas inlet 492A, 592, 692, 792, 892, 992, 1092, 1192, 1292A of the flow divider valve 466, 566, 666, 766, 866, 966, 1066, 1166, 1266.

Some embodiments of the method 6000 may include, while supplying fuel to the flow divider valve 466, 566, 666, 766, 866, 966, 1066, 1166, 1266 via the fuel inlet 490A, 590, 690, 790, 890, 990, 1090, 1190, 1290 of the flow divider valve 466, 566, 666, 766, 866, 966, 1066, 1166, 1266, reducing fuel pressure at the fuel inlet 490A, 590, 690, 790, 890, 990, 1090, 1190, 1290 to between a first prescribed cracking pressure and a second prescribed cracking pressure to cause the flow divider valve 466, 566, 666, 766, 866, 966, 1066, 1166, 1266 to close the second fuel flow path between the fuel inlet 490A, 590, 690, 790, 890, 990, 1090, 1190, 1290 and the second outlet 494B, 594B, 694B, 794B, 894B, 994B, 1094B, 1194B, 1294B. Some embodiments of the method 6000 may include, while fuel pressure at the fuel inlet 490A, 590, 690, 790, 890, 990, 1090, 1190, 1290 is between the first cracking pressure and the second cracking pressure, reducing pressure in the (second) chamber 498B, 598B, 698B, 798B, 898B, 998B, 1098B, 1198B, 1298B of the flow divider valve 466, 566, 666, 766, 866, 966, 1066, 1166, 1266 to actuate a purge valve 495B, 595B, 695B, 795B, 895B, 995B, 1095B, 1195B, 1295B to open the pressurized gas inlet 492A, 592, 692, 792, 892, 992, 1092, 1192, 1292A to the (second) chamber 498B, 598B, 698B, 798B, 898B, 998B, 1098B, 1198B, 1298B and open the gas flow path between the second fuel manifold 62B and the pressurized gas inlet 492A, 592, 692, 792, 892, 992, 1092, 1192, 1292A.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, embodiments multi-engine power plants may include more than two engines wherein the engines may be configured to directly or indirectly drive a common load, purge valves may be solenoid valves, hydraulically actuated valves, or another types of flow control device used for controlling flows (including substantially stopping flows), the embodiments of flow divider valves may use non-spring means for interconnection. Yet further modifications could be implemented by a person of ordinary skill in the art in view of the present disclosure, which modifications would be within the scope of the present technology.

What is claimed is:

1. A fuel system of a gas turbine engine, the fuel system comprising:
   a pressurized gas source;
   a first fuel manifold fluidly connectable to a combustor of the gas turbine engine;
   a second fuel manifold fluidly connectable to the combustor; and
   a flow divider valve actuatable between a first configuration and a second configuration, wherein:
     in the first configuration, the flow divider valve is configured to supply fuel to the first and second fuel manifolds; and
     in the second configuration, the flow divider valve is configured to:
       supply fuel to the first fuel manifold,
       stop supplying fuel to the second fuel manifold, and
       permit pressurized gas to be supplied from the pressurized gas source to the second fuel manifold to flush fuel in the second fuel manifold into the combustor.

2. The fuel system of claim 1, comprising a reservoir for storing the pressurized gas.

3. The fuel system of claim 2, wherein the pressurized gas source is a compressor of the gas turbine engine and the reservoir is in fluid communication with the compressor of the gas turbine engine to receive pressurized air from the compressor.

4. The fuel system of claim 1, comprising a regulator for regulating the pressurized gas supplied to the second fuel manifold.

5. The fuel system of claim 1, wherein the flow divider valve is a spool valve.

6. The fuel system of claim 1, wherein the flow divider valve includes:
   a fuel inlet;
   a first fuel outlet;
   a second fuel outlet;
   a first valve member operatively disposed between the fuel inlet and the first fuel outlet to establish fluid communication between the fuel inlet and the first fuel outlet; and
   a second valve member operatively disposed between the fuel inlet and the second fuel outlet to establish fluid communication between the fuel inlet and the second fuel outlet.

7. The fuel system of claim 6, wherein the flow divider valve includes a gas inlet and a third valve member operatively disposed between the gas inlet and the second fuel outlet to establish fluid communication between the gas inlet and the second fuel outlet.

8. The fuel system of claim 7, wherein the flow divider valve includes a fourth valve member operatively disposed between the gas inlet and the first fuel outlet to establish fluid communication between the gas inlet and the first fuel outlet.

* * * * *